(12) United States Patent
Deng et al.

(10) Patent No.: US 12,520,066 B2
(45) Date of Patent: Jan. 6, 2026

(54) WAVELENGTH SELECTIVE SWITCH, OPTICAL SWITCHING DEVICE, AND SYSTEM

(71) Applicant: Huawei Technologies Co., Ltd., Shenzhen (CN)

(72) Inventors: Ning Deng, Dongguan (CN); Wei Jia, Shenzhen (CN); Liangjia Zong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 18/161,134

(22) Filed: Jan. 30, 2023

(65) Prior Publication Data

US 2023/0179318 A1    Jun. 8, 2023

Related U.S. Application Data

(63) Continuation of application No. PCT/CN2021/099908, filed on Jun. 12, 2021.

(30) Foreign Application Priority Data

Jul. 30, 2020 (CN) .......................... 202010753299.3

(51) Int. Cl.
*H04Q 11/00* (2006.01)
*H04J 14/02* (2006.01)

(52) U.S. Cl.
CPC .... *H04Q 11/0005* (2013.01); *H04J 14/02122* (2023.08); *H04Q 2011/0016* (2013.01)

(58) Field of Classification Search
CPC ...................... H04J 14/02122; H04Q 11/0005
USPC ........................................................... 398/83
See application file for complete search history.

(56) References Cited

U.S. PATENT DOCUMENTS

| | | | |
|---|---|---|---|
| 7,440,648 B2* | 10/2008 | Oikawa .............. | H04Q 11/0005 385/16 |
| 8,855,494 B2 | 10/2014 | Wellbrock et al. | |
| 11,272,269 B1* | 3/2022 | Chedore .......... | H04J 14/02122 |
| 11,316,591 B2* | 4/2022 | Jia ......................... | H04B 10/572 |
| 2008/0267631 A1* | 10/2008 | Collings ............. | H04J 14/0206 398/97 |
| 2011/0085222 A1 | 4/2011 | Komiya | |
| 2014/0348464 A1* | 11/2014 | Kamura .......... | H04B 10/25133 385/24 |

(Continued)

FOREIGN PATENT DOCUMENTS

| | | |
|---|---|---|
| CN | 103197388 A | 7/2013 |
| CN | 103353633 A | 10/2013 |

(Continued)

*Primary Examiner* — Amritbir K Sandhu
(74) *Attorney, Agent, or Firm* — Slater Matsil, LLP

(57) ABSTRACT

A WSS is provided. The WSS includes a first common port, a second common port, a grating, a spatial light modulator, and a plurality of branch ports. The first common port is configured to receive a first-band optical signal, and the second common port is configured to receive a second-band optical signal. The grating is configured to perform wavelength demultiplexing on the first-band optical signal and the second-band optical signal, to output a plurality of first optical signals, where the first optical signals are optical signals of a single wavelength.

20 Claims, 12 Drawing Sheets

(56) References Cited

U.S. PATENT DOCUMENTS

| | | | | |
|---|---|---|---|---|
| 2015/0078748 | A1* | 3/2015 | Tazawa | G02B 6/29311 |
| | | | | 398/48 |
| 2016/0165324 | A1* | 6/2016 | Zhao | G02B 6/2706 |
| | | | | 398/48 |
| 2019/0349112 | A1* | 11/2019 | Seno | H04J 14/0212 |
| 2021/0149118 | A1* | 5/2021 | Xiang | G02B 27/30 |
| 2021/0263218 | A1* | 8/2021 | Robertson | G02B 6/293 |
| 2024/0422456 | A1* | 12/2024 | Nakagawa | H04Q 11/0005 |

FOREIGN PATENT DOCUMENTS

| | | | |
|---|---|---|---|
| CN | 104753624 | A | 7/2015 |
| CN | 107295429 | A | 10/2017 |
| CN | 107667492 | A | 2/2018 |
| CN | 107850738 | A | 3/2018 |
| CN | 108169858 | A | 6/2018 |
| CN | 110121678 | A | 8/2019 |
| CN | 110178062 | A | 8/2019 |
| WO | 2006005191 | A1 | 1/2006 |
| WO | 2019243809 | A1 | 12/2019 |

* cited by examiner

WAVELENGTH SELECTIVE SWITCH, OPTICAL SWITCHING DEVICE, AND SYSTEM

CROSS-REFERENCE TO RELATED APPLICATIONS

This application is a continuation of International Application No. PCT/CN2021/099908, filed on Jun. 12, 2021, which claims priority to Chinese Patent Application No. 202010753299.3, filed on Jul. 30, 2020. The disclosures of the aforementioned applications are hereby incorporated by reference in their entireties.

TECHNICAL FIELD

This application relates to the field of communication technologies, and in particular, to a device and system related to a wavelength selective switch.

BACKGROUND

Currently, a wavelength division multiplexing (WDM) optical communication system is widely used. By using a multiplexer/demultiplexer, WDM can implement a transport capability of dozens of wavelengths or even more than one hundred of wavelengths, thereby improving transmission efficiency. A reconfigurable optical add-drop multiplexer (ROADM) with a dynamic configuration capability is an important basis for intelligent implementation of a WDM network system. Emergence of the ROADM greatly enhances a service scheduling capability, reliability, and maintainability of the WDM system, thereby truly implementing flexible optical-layer networking. As a core part for implementing the ROADM, a wavelength selective switch (WSS) can implement a larger port quantity (dimension quantity, Degree) by using free space optical switching.

Currently, the ROADM has evolved from a simple two-dimensional architecture to a more complex multi-dimensional architecture. In addition, to meet an increasing demand for a communication capacity, an operating band of the communication system has gradually extended from an original conventional band (C-band) to a long wavelength band (L-band). Based on this, the WDM optical communication system and nodes also need to be upgraded, to support transmission in the C-band and the L-band.

SUMMARY

Embodiments of this application provide a wavelength selective switch, an optical switching device, and a system, to match and support an extended band by using a simplified device and system structure, thereby reducing complexity and costs.

To achieve the foregoing objective, embodiments of this application provide the following technical solutions.

According to a first aspect, this application provides a wavelength selective switch WSS. The WSS includes a first common port, a second common port, a grating, a spatial light modulator, and a plurality of branch ports. The first common port is configured to receive a first-band optical signal, and the second common port is configured to receive a second-band optical signal. The grating is configured to perform wavelength demultiplexing on the first-band optical signal and the second-band optical signal, to output a plurality of first optical signals, where the first optical signals are optical signals of a single wavelength. The spatial light modulator is configured to perform spatial angle deflection on the plurality of first optical signals, to obtain a plurality of angle-deflected second optical signals. The grating is further configured to perform wavelength multiplexing on the plurality of second optical signals, to obtain a plurality of third optical signals. The plurality of branch ports are configured to output the plurality of third optical signals.

According to a solution provided in this embodiment of this application, by using the 2×N WSS, the first-band optical signal is received from the first common port, the second-band optical signal is received from the second common port, and then wavelength selective processing is performed on the first-band optical signal and the second-band optical signal in the WSS. In this way, optical signals in two bands can be simultaneously processed inside a same WSS, reducing complexity and costs. With reference to the first aspect, in a possible implementation, the WSS further includes a filter. The filter is located between the first common port and the grating and further located between the second common port and the grating. The filter is configured to couple the first-band optical signal input from the first common port and the second-band optical signal input from the second common port into a combined signal. The filter couples the first-band optical signal and the second-band optical signal into a combined signal, so that the first-band optical signal and the second-band optical signal can be selected and processed together in a following spatial optical device.

With reference to the first aspect, in a possible implementation, at least one of the third optical signals includes a first sub-wavelength and a second sub-wavelength. The first sub-wavelength belongs to a range of a first band, and the second sub-wavelength belongs to a range of a second band. In this way, the plurality of third optical signals obtained after the grating performs multiplexing may be cross-band optical signals of a plurality of wavelengths, and therefore, can be directly output from the plurality of branch ports. This eliminates a need to perform the following operations before outputting an optical signal: coupling two light beams in different bands into one light beam by using a coupler, and then emitting the light beam.

With reference to the first aspect, in another possible implementation, the WSS further includes a first lens group. The first lens group is located between the first common port and the grating and located between the second common port and the grating. The first lens group is configured to focus the first-band optical signal, the second-band optical signal, and the plurality of third optical signals.

With reference to the first aspect, in another possible implementation, the WSS further includes a second lens group. The second lens group is located between the grating and the spatial light modulator, and configured to focus the plurality of second optical signals.

In this embodiment, the spatial light modulator is disposed on a focal point of the second lens group.

The first lens group may include only one lens, may include a plurality of lenses, or may include one or more reflective lenses, and the second lens group also may include only one lens, may include a plurality of lenses, or may include one or more reflective lenses. This is not limited in this application. When the second lens group includes only one lens, the spatial light modulator is disposed on a focal point of the lens. When the second lens group includes a plurality of lenses, the spatial light modulator is disposed on focal points of all the plurality of lenses.

With reference to the first aspect, in a possible implementation, the WSS further includes a collimating lens group. The collimating lens group includes N collimating lenses. A first of the collimating lenses is located between the first common port and the first lens group, and configured to collimate the first-band optical signal. A second of the collimating lenses is located between the second common port and the first lens group, and configured to collimate the second-band optical signal. Third to $N^{th}$ of the collimating lenses are located between the plurality of branch ports and the first lens group, and configured to collimate the plurality of third optical signals, where N is an integer greater than 3. In this way, it can be ensured that the optical signals input into the WSS and output from the WSS remain collimated.

With reference to the first aspect, in a possible implementation, the first-band optical signal is a C-band optical signal, and/or the second-band optical signal is an L-band optical signal. Alternatively, the first-band optical signal is a C-band optical signal, and the second-band optical signal is an S-band optical signal. As technologies develop, the first-band optical signal may alternatively be an optical signal in another band other than a C-band, and the second-band optical signal may be an optical signal in another band other than an L-band and an S-band. This is not limited in this application.

With reference to the first aspect, in a possible implementation, the grating includes a first grating and a second grating. The first grating is configured to demultiplex the first-band optical signal. The second grating is configured to demultiplex the second-band optical signal. The grating may be a diffraction grating, or may be another type of grating. This is not limited in this application.

With reference to the first aspect, in a possible implementation, the WSS further includes a plurality of filters. The plurality of filters are located between the plurality of branch ports and the first lens group, respectively. After the grating performs wavelength multiplexing on the plurality of second optical signals and obtains the plurality of third optical signals, the filter couples third optical signals that are in different bands and that emerge from a same branch port into a combined signal.

It should be noted that that the grating is further configured to perform wavelength multiplexing on the plurality of second optical signals, to obtain a plurality of third optical signals may be specifically: The grating performs wavelength multiplexing on the plurality of second optical signals based on the branch ports from which the plurality of second optical signals emerge, to obtain the plurality of third optical signals. For example, at least two second optical signals emerge from a branch port located above the first common port, the grating multiplexes the at least two second optical signals into a third optical signal, and the third optical signal emerges from the branch port above the first common port after passing through the first lens group.

According to a second aspect, this application further provides a WSS. The WSS includes a plurality of branch ports, a first common port, a second common port, a grating, and a spatial light modulator. The plurality of branch ports are configured to receive a plurality of fourth optical signals, at least one of the fourth optical signals includes a first sub-wavelength and a second sub-wavelength, the first sub-wavelength belongs to a range of a first band, and the second sub-wavelength belongs to a range of a second band. The grating is configured to perform wavelength demultiplexing on the plurality of fourth optical signals, to output a plurality of fifth optical signals, where the fifth optical signals are optical signals of a single wavelength. The spatial light modulator is configured to perform spatial angle deflection on the plurality of fifth optical signals, to obtain a plurality of sixth optical signals. The grating is further configured to perform wavelength multiplexing on the plurality of sixth optical signals, to output seventh optical signals, where the seventh optical signals are optical signals of a plurality of wavelengths and include both a sub-wavelength located in the first band and a sub-wavelength located in the second band. The first common port is configured to output a first-band optical signal in the seventh optical signals, and the second common port is configured to output a second-band optical signal in the seventh optical signals.

With reference to the second aspect, in a possible implementation, the WSS further includes a filter. The filter is configured to split the seventh optical signal into the first-band optical signal and the second-band optical signal. The first-band optical signal is output from the first common port, and the second-band optical signal is output from the second common port.

With reference to the second aspect, in a possible implementation, the WSS further includes a first lens group. The first lens group is located between the first common port and the grating, located between the second common port and the grating, and further located between the plurality of branch ports and the grating. The first lens group is configured to focus the fourth optical signals and the seventh optical signal.

With reference to the second aspect, in another possible implementation, the WSS further includes a second lens group. The second lens group is located between the grating and the spatial light modulator, and configured to focus the plurality of sixth optical signals.

In this embodiment, the spatial light modulator is disposed on a focal point of the second lens group.

It should be noted that the first lens group may include only one lens, may include a plurality of lenses, or may include one or more reflective lenses, and the second lens group also may include only one lens, may include a plurality of lenses, or may include one or more reflective lenses. This is not limited in this application.

With reference to the second aspect, in a possible implementation, the WSS further includes a collimating lens group. The collimating lens group includes N collimating lenses. A first of the collimating lenses is located between the first common port and the first lens group, and configured to collimate the first-band optical signal. A second of the collimating lenses is located between the second common port and the first lens group, and configured to collimate the second-band optical signal. Third to $N^{th}$ of the collimating lenses are located between the plurality of branch ports and the first lens group, and configured to collimate the plurality of fourth optical signals, where N is an integer greater than 3. In this way, it can be ensured that the optical signals input into the WSS and output from the WSS remain collimated.

With reference to the second aspect, in a possible implementation, the first-band optical signal is a C-band optical signal, and/or the second-band optical signal is an L-band optical signal. Alternatively, the first-band optical signal is a C-band optical signal, and the second-band optical signal is an S-band optical signal. As technologies develop, the first-band optical signal may alternatively be an optical signal in another band other than a C-band, and the second-band optical signal may be an optical signal in another band other than an L-band and an S-band. This is not limited in this application.

With reference to the second aspect, in a possible implementation, the WSS further includes a plurality of filters. The plurality of filters are located between the plurality of branch ports and the first lens group, respectively. When the plurality of fourth optical signals enter the WSS from the branch ports, the filters split each fourth optical signal into a first-band optical signal and a second-band optical signal.

With reference to the second aspect, in a possible implementation, the grating includes a first grating and a second grating. The first grating is configured to demultiplex the first-band optical signals in the fourth optical signals. The second grating is configured to demultiplex the second-band optical signals in the fourth optical signals.

According to a third aspect, this application further provides a WSS. The WSS includes a plurality of branch ports, a first common port, a second common port, a grating, and a spatial light modulator. The plurality of branch ports are configured to receive a plurality of fourth optical signals, one of the branch ports corresponds to one of the fourth optical signals, at least one of the fourth optical signals includes a first sub-wavelength and a second sub-wavelength, the first sub-wavelength belongs to a range of a first band, and the second sub-wavelength belongs to a range of a second band. The grating is configured to demultiplex the plurality of fourth optical signals, to output a plurality of fifth optical signals, where the fifth optical signals are optical signals of a single wavelength. The spatial light modulator is configured to perform spatial angle deflection on the plurality of fifth optical signals, to obtain a plurality of sixth optical signals. The grating is further configured to perform wavelength multiplexing on the plurality of sixth optical signals, to output a first-band optical signal and a second-band optical signal. The first common port is configured to output the first-band optical signal, and the second common port is configured to output the second-band optical signal.

With reference to the third aspect, in a possible implementation, the WSS further includes a plurality of filters. The plurality of filters are located between the plurality of branch ports and a first lens group, and configured to split the plurality of fourth optical signals into sub-signals including a first-band wavelength sub-signals and a second-band wavelength subsignals. In this way, after the sub-signals including the first-band wavelength and the sub-signals including the second-band wavelength are separately demultiplexed by the grating, a plurality of fifth optical signals belonging to the first band and a plurality of fifth optical signals belonging to the second band are obtained.

With reference to the third aspect, in a possible implementation, the grating includes a first grating and a second grating. The first grating is configured to perform wavelength demultiplexing on the first-band optical signal. The second grating is configured to perform wavelength demultiplexing on the second-band optical signal.

According to a fourth aspect, this application provides a wavelength processing method. The method is applied to a wavelength selective switch WSS. The WSS includes a first common port, a second common port, a grating, a spatial light modulator, and a plurality of branch ports. The method includes: the first common port receives a first-band optical signal, and the second common port receives a second-band optical signal; the grating performs wavelength demultiplexing on the first-band optical signal and the second-band optical signal, to output a plurality of first optical signals, where the first optical signals are optical signals of a single wavelength; and the spatial light modulator performs spatial angle deflection on the plurality of first optical signals, to obtain a plurality of angle-deflected second optical signals; the grating performs wavelength multiplexing on the plurality of second optical signals, to obtain a plurality of third optical signals; and the plurality of branch ports output the plurality of third optical signals.

According to a solution provided in this embodiment of this application, by using the 2×N WSS, the first-band optical signal is received from the first common port, the second-band optical signal is received from the second common port, and then wavelength selective processing is performed on the first-band optical signal and the second-band optical signal in the WSS. In this way, optical signals in two bands can be simultaneously processed inside a same WSS, reducing complexity and costs.

With reference to the fourth aspect, in a possible implementation, the method further includes: A filter couples the first-band optical signal input from the first common port and the second-band optical signal input from the second common port into a combined signal. The filter is located between the first common port and the grating and further located between the second common port and the grating. The filter couples the first-band optical signal and the second-band optical signal into the combined signal, so that the first-band optical signal and the second-band optical signal can be selected and processed together in a following spatial optical device.

With reference to the fourth aspect, in another possible implementation, at least one of the third optical signals includes a first sub-wavelength and a second sub-wavelength. The first sub-wavelength belongs to a range of a first band, and the second sub-wavelength belongs to a range of a second band.

With reference to the fourth aspect, in a possible implementation, the method further includes: a first lens group focuses the first-band optical signal, the second-band optical signal, and the plurality of third optical signals, where the first lens group is located between the first common port and the grating and further located between the second common port and the grating; and/or a second lens group focuses the plurality of second optical signals, where the second lens group is located between the grating and the spatial light modulator.

With reference to the fourth aspect, in a possible implementation, the method further includes: a first collimating lens collimates the first-band optical signal, where the first collimating lens is located between the first common port and the first lens group; a second collimating lens collimates the second-band optical signal, where the second collimating lens is located between the second common port and the first lens group; and third to $N^{th}$ collimating lenses collimate the plurality of third optical signals, where the third to $N^{th}$ collimating lenses are located between the plurality of branch ports and the first lens group. In this way, it can be ensured that the optical signals input into the WSS and output from the WSS remain collimated.

With reference to the fourth aspect, in a possible implementation, the first-band optical signal is a C-band optical signal, and/or the second-band optical signal is an L-band optical signal. Alternatively, the first-band optical signal is a C-band optical signal, and the second-band optical signal is an S-band optical signal. As technologies develop, the first-band optical signal may alternatively be an optical signal in another band other than a C-band, and the second-band optical signal may be an optical signal in another band other than an L-band and an S-band. This is not limited in this application.

According to a fifth aspect, this application further provides a wavelength processing method. The method is applied to a WSS. The WSS includes a plurality of branch ports, a first common port, a second common port, a grating, and a spatial light modulator. The method includes: The plurality of branch ports receive a plurality of fourth optical signals, where the fourth optical signals are optical signals of a plurality of wavelengths; the diffraction grating performs wavelength demultiplexing on the plurality of fourth optical signals, to output a plurality of fifth optical signals, where the fifth optical signals are optical signals of a single wavelength; the spatial light modulator performs spatial angle deflection on the plurality of fifth optical signals, to obtain a plurality of sixth optical signals; the grating performs wavelength multiplexing on the plurality of sixth optical signals, to output seventh optical signals, where the seventh optical signals include a first-band optical signal and a second-band optical signal; and the first common port outputs the first-band optical signal in the seventh optical signals, and the second common port outputs the second-band optical signal in the seventh optical signals.

With reference to the fifth aspect, in a possible implementation, the seventh optical signals are optical signals of a plurality of wavelengths and include a first sub-wavelength and a second sub-wavelength. The WSS further includes a filter. The filter is located between the first common port and the grating and further located between the second common port and the grating. The method further includes: The filter splits the seventh optical signal into the first-band optical signal and the second-band optical signal. The first-band optical signal is output from the first common port, and the second-band optical signal is output from the second common port.

With reference to the fifth aspect, in a possible implementation, the method further includes: A first lens group focuses the fourth optical signals and the seventh optical signal, where the first lens group is located between the first common port and the grating and located between the second common port and the grating; and a second lens group focuses the plurality of sixth optical signals, where the second lens group is located between the grating and the spatial light modulator.

In this embodiment, the spatial light modulator is disposed on a focal point of the second lens group.

It should be noted that the first lens group may include only one lens, may include a plurality of lenses, or may include one or more reflective lenses, and the second lens group also may include only one lens, may include a plurality of lenses, or may include one or more reflective lenses. This is not limited in this application.

With reference to the fifth aspect, in a possible implementation, the method further includes: A collimating lens group collimates the first-band optical signal, where the collimating lens group includes N collimating lenses, and a first of the collimating lenses is located between the first common port and the first lens group; a second of the collimating lenses collimates the second-band optical signal, where the second of the collimating lenses is located between the second common port and the first lens group; and third to $N^{th}$ of the collimating lenses collimate the plurality of fourth optical signals, where the third to $N^{th}$ of the collimating lenses are located between the plurality of branch ports and the first lens group, and N is an integer greater than 3. In this way, it can be ensured that the optical signals input into the WSS and output from the WSS remain collimated.

With reference to the fifth aspect, in a possible implementation, the first-band optical signal is a C-band optical signal, and/or the second-band optical signal is an L-band optical signal. Alternatively, the first-band optical signal is a C-band optical signal, and the second-band optical signal is an S-band optical signal. As technologies develop, the first-band optical signal may alternatively be an optical signal in another band other than a C-band, and the second-band optical signal may be an optical signal in another band other than an L-band and an S-band. This is not limited in this application.

With reference to the fifth aspect, in a possible implementation, the method further includes: When the plurality of fourth optical signals enter the WSS from the branch ports, a plurality of filters split each fourth optical signal into a first-band optical signal and a second-band optical signal. The plurality of filters are located between the plurality of branch ports and the first lens group, respectively.

With reference to the fifth aspect, in a possible implementation, the grating includes a first grating and a second grating. The first grating is configured to demultiplex the first-band optical signals in the fourth optical signals. The second grating is configured to demultiplex the second-band optical signals in the fourth optical signals.

According to a sixth aspect, this application provides an optical switching device. The optical switching device includes: a first WSS according to any one of the first aspect or the possible implementations with reference to the first aspect; a first down module, connected to one of branch ports of the first WSS and configured to drop a first-band optical signal; and a second down module, connected to another of the branch ports of the first WSS and configured to drop a second-band optical signal.

The optical switching device provided in this application is used at a node in an optical system, and may drop optical signals in different directions (dimensions). The first-band optical signal is dropped by the first down module, and the second-band optical signal is dropped by the second down module. In this way, the optical network device can simultaneously drop optical signals that are in two bands.

It should be noted that if the first down module supports only dropping of the first-band optical signal, a spatial light modulator in the WSS should be controlled to enable the first-band optical signal to emerge from the branch port connected to the first down module; and correspondingly, if the second down module supports only dropping of the second-band optical signal, the spatial light modulator in the WSS should be controlled to enable the second-band optical signal to emerge from the branch port connected to the second down module.

With reference to the sixth aspect, in a possible implementation, the optical switching device further includes: a first waveband filter array, located between the first WSS and the first down module and further located between the first WSS and the second down module, and including M common ports and 2M branch ports, where the M common ports are connected to the M branch ports of the first WSS, respectively, M of the 2M branch ports are connected to the first down module, the other M of the 2M branch ports are connected to the second down module, and M is an integer greater than or equal to 1; and the first waveband filter array is configured to split M optical signals output from the branch ports of the first WSS into M first-band optical signals and M second-band optical signals. In this way, regardless of whether a branch port that is of the first WSS and that is connected to a common port of the first waveband filter array outputs a first-band optical signal, a second-band optical signal, or a combined signal of a first-band optical signal and a second-band optical signal, the first-band optical signal, the second-band optical signal, and the combined signal can all be received by the common port of the first waveband filter array.

With reference to the sixth aspect, in a possible implementation, the optical switching device further includes a first optical amplifier. An output terminal of the first optical amplifier is connected to a first common port of the first WSS and configured to amplify a first-band optical signal. The optical switching device may further include a second optical amplifier. An output terminal of the second optical amplifier is connected to a second common port of the first WSS and configured to amplify a second-band optical signal.

With reference to the sixth aspect, in a possible implementation, the optical switching device further includes a first waveband filter. The first waveband filter includes one input port and two output ports. One of the output ports is connected to an input terminal of the first optical amplifier, and the other of the output ports is connected to an input terminal of the second optical amplifier. The first waveband filter is configured to split an optical signal that enters from the input port into a first-band optical signal and a second-band optical signal.

With reference to the sixth aspect, in a possible implementation, the optical switching device further includes: a second WSS according to any one of the second aspect and the possible implementations with reference to the second aspect; a first up module, connected to one of branch ports of the second WSS by using an optical fiber, and configured to add a first-band optical signal; and a second up module, connected to one of the branch ports of the second WSS by using an optical fiber, and configured to add a second-band optical signal.

With reference to the sixth aspect, in a possible implementation, the optical switching device further includes: a second waveband filter array, located between the second WSS and the first up module and further located between the second WSS and the second up module, and including N common ports and 2N branch ports, where the N common ports are connected to the N branch ports of the second WSS, respectively, N of the 2N branch ports are connected to the first up module, and the other N of the 2N branch ports are connected to the second up module; and the second waveband filter array is configured to combine N received first-band optical signals and N received second-band optical signals into N optical signals.

With reference to the sixth aspect, in a possible implementation, the optical switching device further includes: a third optical amplifier, where an input terminal of the third optical amplifier is connected to a first common port of the second WSS and configured to amplify a first-band optical signal; and a fourth optical amplifier, where an input terminal of the fourth optical amplifier is connected to a second common port of the second WSS and configured to amplify a second-band optical signal.

With reference to the sixth aspect, in a possible implementation, the optical switching device further includes a second waveband filter. The second waveband filter includes two input ports and one output port. One of the input ports is connected to an output terminal of the third optical amplifier, and the other of the input ports is connected to an output terminal of the fourth optical amplifier. The second waveband filter is configured to couple a first-band optical signal and a second-band optical signal that enter from the two input ports into a combined signal.

With reference to the sixth aspect, in a possible implementation, the optical switching device further includes: at least one of third WSSs according to any one of the first aspect and the possible implementations with reference to the first aspect, where at least one of branch ports of the third WSS is connected to at least one of the branch ports of the first WSS; and at least one of fourth WSSs according to any one of the first aspect and the possible implementations with reference to the first aspect, where at least one of branch ports of the fourth WSS is connected to at least one of the branch ports of the second WSS.

With reference to the sixth aspect, in a possible implementation, the first down module is further configured to drop the second-band optical signal; and/or the first up module is further configured to add the second-band optical signal.

With reference to the sixth aspect, in a possible implementation, the first down module is further configured to add the first-band optical signal; and/or the second down module is further configured to add the second-band optical signal.

According to a seventh aspect, this application provides a wavelength division multiplexing system. The wavelength division multiplexing system includes at least two optical switching devices according to any one of the sixth aspect and the possible implementations with reference to the sixth aspect. In the technical solutions provided in this application, by using the 2×N WSS and the relevant optical network device and system, the first-band optical signal is received from the first common port, the second-band optical signal is received from the second common port, and then wavelength selective processing is performed on the first-band optical signal and the second-band optical signal in the WSS. In this way, optical signals in two bands can be processed together inside a same WSS, thereby supporting an extended band by using a simplified device and system structure, and reducing complexity and costs.

BRIEF DESCRIPTION OF THE DRAWINGS

To describe technical solutions in embodiments of this application or in a current technology more clearly, the following briefly describes the accompanying drawings for describing embodiments or the current technology. It is clear that the accompanying drawings in the following descriptions merely show some embodiments of this application, and a person of ordinary skill in the art can derive other implementations of this application from these accompanying drawings without creative efforts. All these embodiments or implementations fall within the protection scope of this application.

DETAILED DESCRIPTION OF ILLUSTRATIVE EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment.

The technical solutions in embodiments of this application may be applied to various optical communication systems, for example, a wavelength division multiplexing (WDM) system, an optical transport network (OTN), a WDM-based automatically switched optical network (WSON), or another optical network system. This is not limited in this application.

As one of service bearer networks most commonly used by an operator, an optical network usually uses a static path configuration method. However, as a capacity of a network service continues to increase and the network service is increasingly dynamic, the static path configuration method clearly can no longer meet a service development need. The operator is increasingly demanding dynamic service path configuration.

A reconfigurable add-drop multiplexer ROADM is a key device that supports dynamic service path configuration being implemented in the optical network. The ROADM supports adding/dropping/blocking of any wavelength service, and can implement any extension of a communication service through remote software control, thereby achieving great flexibility. A wavelength selective switch WSS is a core sub-device of the ROADM, and can transmit and switch any wavelength in a plurality of directions. A quantity of ports in the WSS determines a quantity of directional dimensions in which optical signals are transmitted and switched. As a networking structure of a ROADM node continuously develops, to meet optical wavelength switching in more directions, the WSS also develops in a direction of providing a larger port quantity.

There are a plurality of technologies for implementing the WSS. Currently, a mainstream manner is using a liquid crystal on silicon (LCOS). The LCOS technology can provide a finer frequency resolution and also has advantages over other existing technologies in performance indicators. The LCOS technology implements spatial deflection on an optical path by controlling a change in a phase of the optical path. Deflection angles of the optical path directly determine a port quantity of a WSS, and the deflection angles of the optical path are in a one-to-one correspondence with output ports of optical signals.

Figure 1:
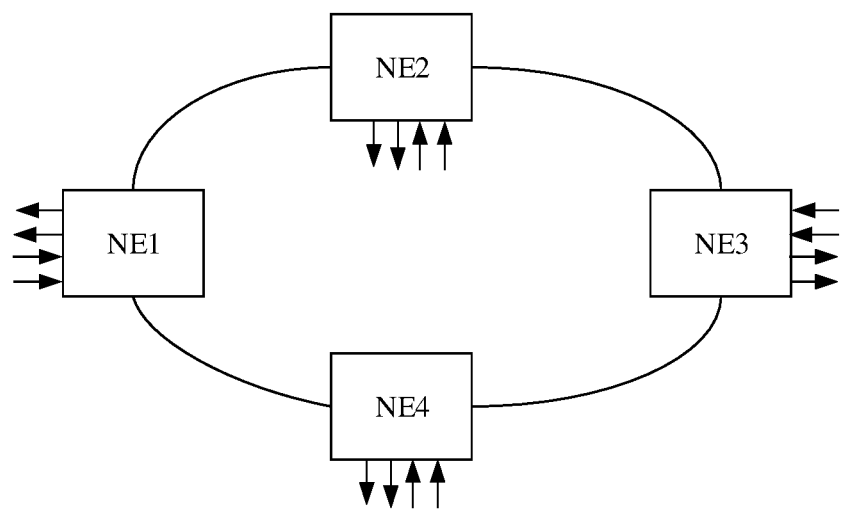
FIG. 1 is a schematic diagram of a possible application scenario of a WSS according to an embodiment of this application.

FIG. 1 is a schematic diagram of a possible application scenario of a WSS according to an embodiment of this application. FIG. 1 shows an example of a ring optical network. The optical network includes four ROADM nodes, namely, an NE1, an NE2, an NE3, and an NE4, with two dimensions. Each node supports local adding, local dropping, or passing-through of a wavelength, and is directly connected to other two nodes. As an important core sub-device of a ROADM node, a WSS is configured to select a combination of signals of any wavelengths from any input signals of a plurality of wavelengths and output the combination to any one or more of N output ports. In addition, the WSS may also combine input signals in N ports and output a combined signal to one or more output ports. It should be noted that because an optical path is reversible, a 1×N (that is, one input port and N output ports) WSS may also be used as an N×1 WSS. A WSS in embodiments of this application may be a 2×N WSS, or may be an M×N WSS as future optical communication develops. This is not limited in this application.

Figure 2:
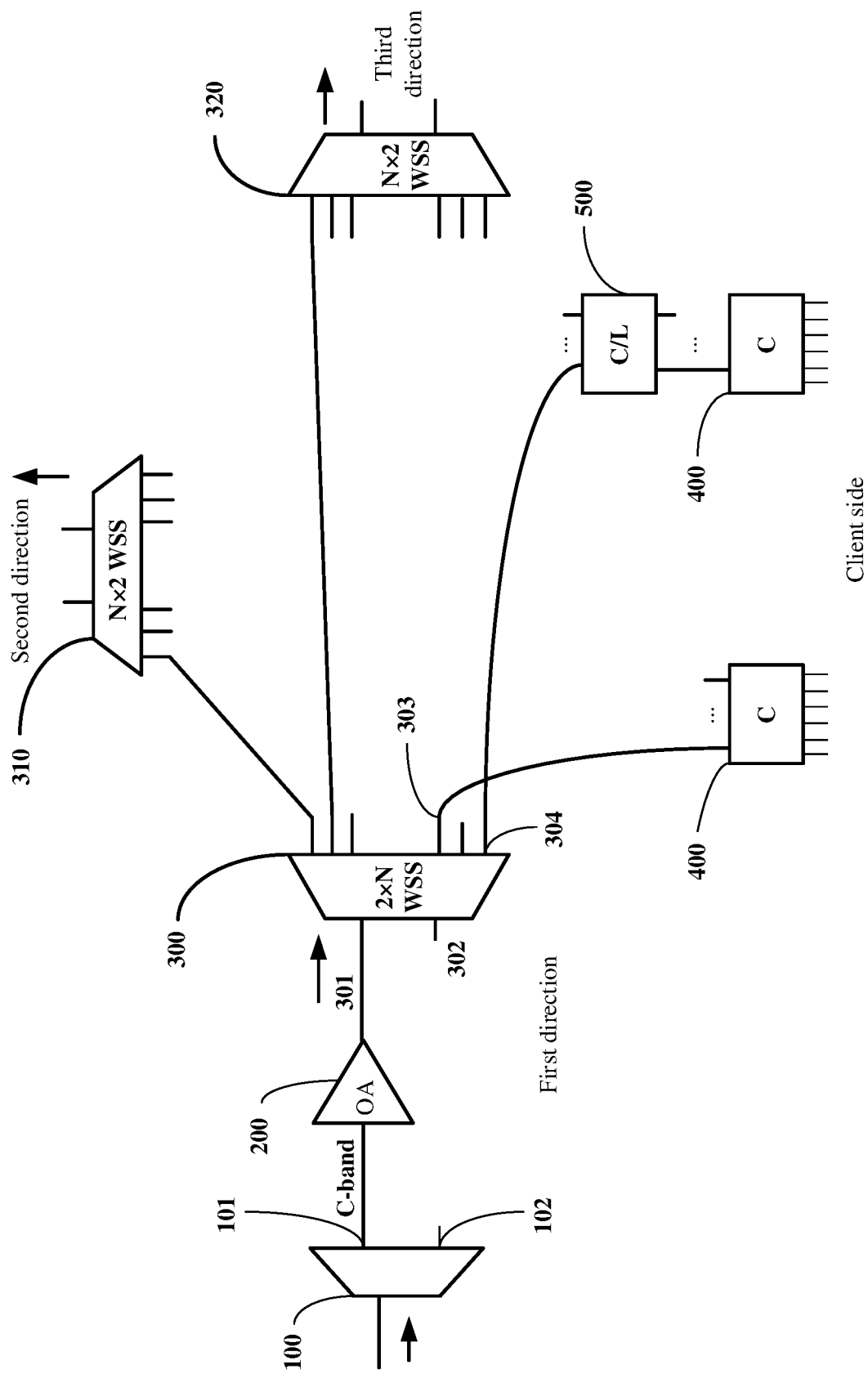
FIG. 2 is a schematic diagram of a possible structure of a ROADM node according to an embodiment of this application.

FIG. 2 is a schematic diagram of a possible structure of a ROADM node (for example, an NE4) shown in FIG. 1. For simplicity, FIG. 2 shows only devices used in a direction of receiving an optical signal. As shown in FIG. 2, the ROADM site includes three dimensions (a first direction, a second direction, and a third direction) and a client side. Each dimension may include a plurality of WSSs, and only one is shown in this embodiment. A waveband filter 100 has one common port and two branch ports 101 and 102. An optical signal enters the waveband filter 100 from an optical fiber on a left side, and then a C-band optical signal is output from the branch port 101. The branch port 101 is followed by a C-band optical amplifier 200. The branch port 102 is a reserved port, is idle in this case, and is used when service traffic increases. Optionally, the waveband filter 100 may further include a supervisory port, configured to output a signal of a wavelength that is to be transmitted in an optical supervisory channel and that is obtained through demultiplexing. The C-band optical signals output from the branch port 101 are optical signals of a plurality of wavelengths. After the optical amplifier 200 amplifies a power of the optical signals of a plurality of wavelengths, the optical signals of a plurality of wavelengths enter a WSS 300 from a common port 301. Wavelength demultiplexing, cross-connecting, and combining are performed on the optical signals of a plurality of wavelengths in the WSS 300, and then a plurality of branch signals are formed. The plurality of branch signals are output to WSSs in different dimensions, or locally dropped and output to the client side from a plurality of branch ports of the WSS 300, respectively.

The embodiment shown in FIG. 2 is usually applied to an initial phase that exists after a WDM optical network is built. In the initial phase, service traffic is not excessively heavy, and therefore, using only a first band, for example, a C-band, to bear services can meet a requirement.

It should be noted that different from a 1×N WSS commonly used in a conventional optical communication network, the 2×N WSS used in the embodiment shown in FIG. 2 includes two common ports 301 and 302. The common port 301 corresponds to a C-band wavelength, that is, can effectively process a C-band optical signal. The common port 302 is a reserved port, and corresponds to a second band, for example, an L-band wavelength, that is, can effectively process only an L-band optical signal. The common port 302 is open for use after an operating band extends from the C-band to an L-band. All the branch ports correspond to a C-band wavelength and an L-band wavelength. That is, each output port can support processing of a C-band optical signal, an L-band optical signal, and also a combined signal of a C-band optical signal and an L-band optical signal. The WSS 300 can selectively output, to any branch port, an any-wavelength optical signal that is from any common port. Some of the branch ports of the WSS 300 are separately connected to branch ports of a WSS 310 and a WSS 320 in other dimensions. It should be noted that functions of ports of the WSS 310 and the WSS 320 are opposite to functions of the ports of the WSS 300. To be specific, N branch ports of each of the WSS 310 and the WSS 320 are used as input ports, and two common ports of each of the WSS 310 and the WSS 320 are used as output ports, with one correspondingly outputting a C-band optical signal and the other correspondingly outputting an L-band optical signal. The WSS 300, the WSS 310, and the WSS 320 may be same wavelength selective switches except for a direction of use, or may be slightly different, for example, with or without an optical isolator depending on the direction of use.

It should be further noted that there are at least two manners for implementing connecting some of the branch ports of the WSS 300 to a local down module 400. In a manner 1, a branch port 303 of the WSS 300 is directly connected to the local down module 400. The local down module 400 supports only processing of a C-band optical signal. The local down module 400 has a plurality of input ports, respectively connected to the WSSs in the different dimensions, and a plurality of output ports, connected to a C-band optical signal receiver. In a manner 2, when a service bearer wavelength extends to the L-band, a branch port 304 of the WSS 300 may first be connected to a waveband filter array 500. The waveband filter array 500 is configured to split an input combined signal into a C-band optical signal and an L-band optical signal. The waveband filter array 500 has M common ports, configured to receive C+L combined signals from a plurality of dimensions. The waveband filter array 500 has 2M branch ports, with M branch ports outputting C-band optical signals and the other M branch ports outputting L-band optical signals. The 2M branch ports are then connected to corresponding local down modules, respectively. It should be understood that the manner 2 is generally applicable to a scenario in which the C-band and the L-band coexist. The manner 1 and the manner 2 may be used separately or in combination. Which manner is specifically used may be determined based on whether a downlink signal output by a WSS is a combined signal including two bands. This is not limited in this application.

It should be understood that an example in which a first-band optical signal is a C-band optical signal, and a second-band optical signal is an L-band optical signal is used for description in this application. Actually, the second-band optical signal may alternatively be an S-band optical signal. This is not limited in this application. A band in this application may also be referred to as a waveband, for example, a C-waveband and an L-waveband.

Figure 3:
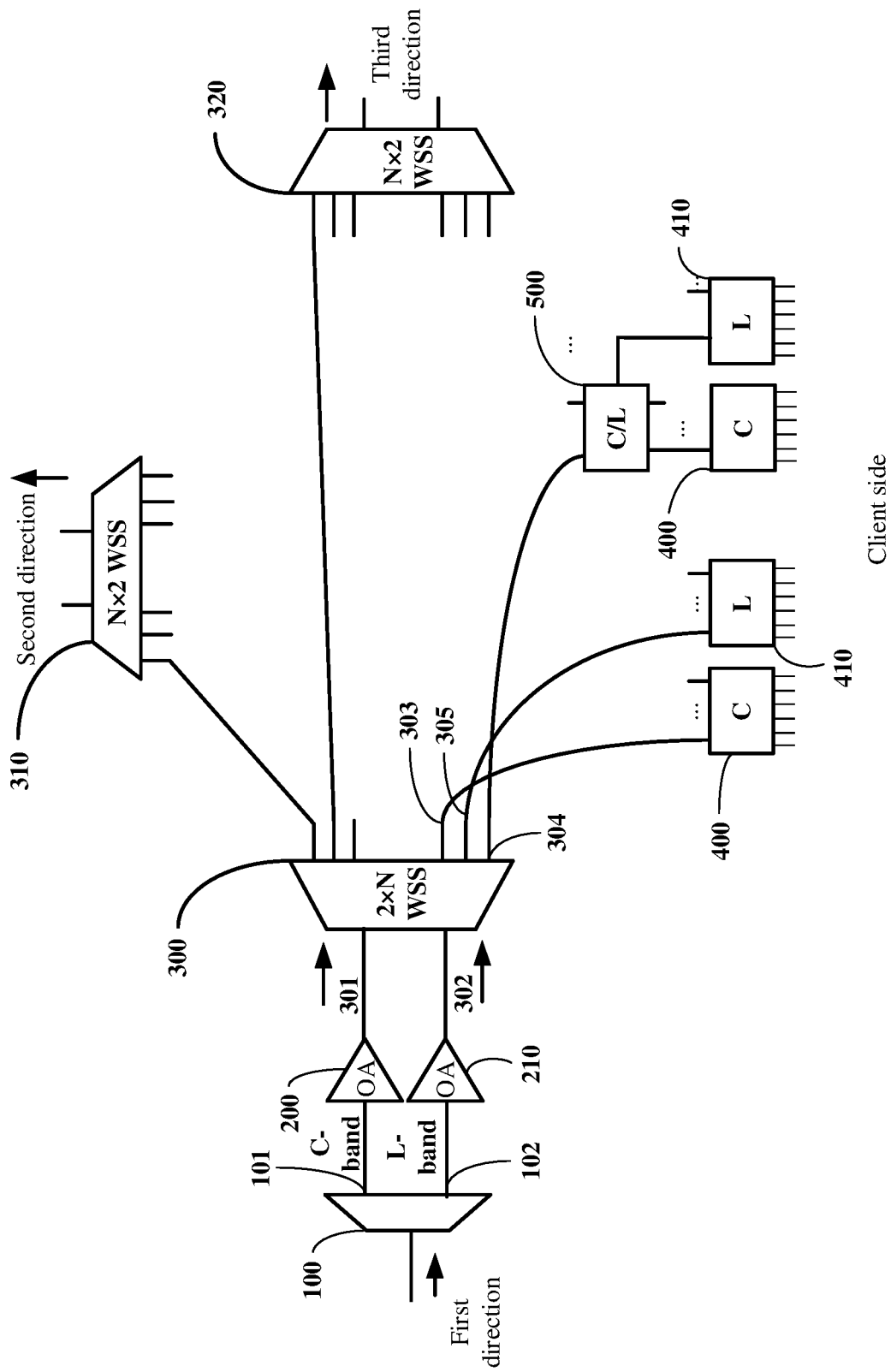
FIG. 3 is a schematic diagram of another possible structure of a ROADM node according to an embodiment of this application.

FIG. 3 is a schematic diagram of another possible structure of a ROADM node. As traffic in a WDM optical network increases, a service bearer wavelength gradually extends to an L-band. In this case, a device processing the L-band needs to be added accordingly. A specific configuration may be implemented on a basis of the node structure shown in FIG. 2, without replacing the WSS device. As shown in FIG. 3, an L-band optical amplifier 210 is connected at the L-band branch port 102 of the waveband filter 100. An output terminal of the L-band optical amplifier 210 is further connected to the input port 302 of the 2×N WSS 300. Wavelength demultiplexing, cross-connecting, and combining are performed on an L-band combined signal in the WSS, and then a plurality of branch signals are formed. The plurality of branch signals may be single-waveband combined signals, for example, L-band combined signals, or may be multi-waveband combined signals, for example, C+L signals. The plurality of branch signals are output to the WSSs in the different dimensions, or locally dropped and output to the client side from the plurality of branch ports of the WSS 300, respectively.

There are also two manners for dropping an L-band optical signal. In a manner 1, a branch port 305 of the WSS 300 is directly connected to a local down module 410. The local down module 410 supports only processing of the L-band optical signal. The local down module 410 has a plurality of input ports and a plurality of output ports. The plurality of input ports are respectively connected to the WSSs in the different dimensions and configured to receive L-band optical signals in the different dimensions. The plurality of output ports are connected to an L-band optical signal receiver. In a manner 2, the branch port 304 of the WSS 300 is first connected to the waveband filter array 500. The waveband filter array 500 is configured to split an input combined signal into a C-band optical signal and an L-band optical signal. The waveband filter array 500 has M common ports, configured to receive C+L combined signals from a plurality of dimensions. The waveband filter array 500 has 2M branch ports, with M branch ports outputting C-band optical signals and the other M branch ports outputting L-band optical signals. The 2M branch ports are then connected to corresponding local down modules, respectively. The manner 1 and the manner 2 may be used separately or in combination. How the manners are specifically used may be determined based on whether a downlink signal output by a WSS is a combined signal including two bands. This is not limited in this application.

Figure 4:
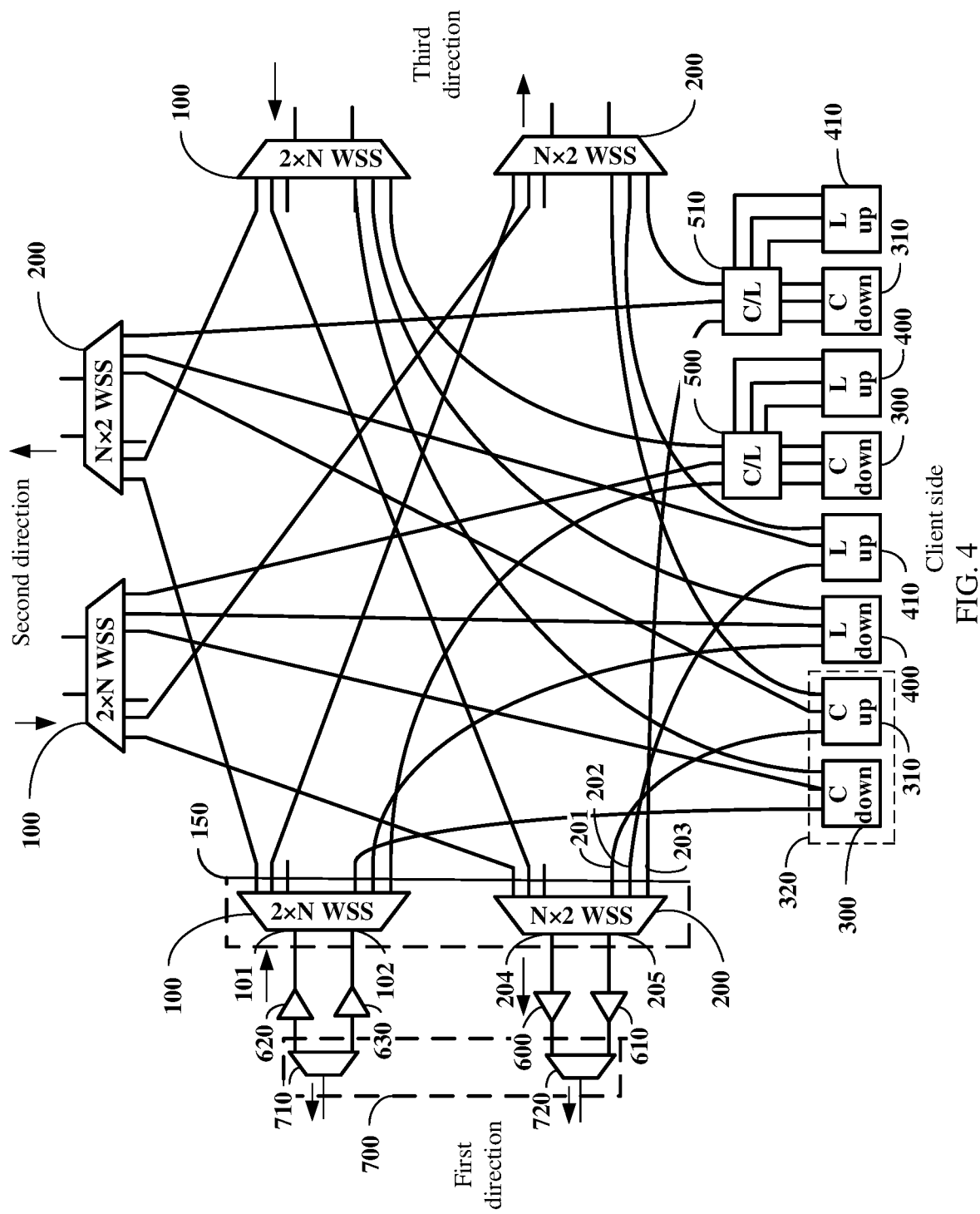
FIG. 4 is a schematic diagram of still another possible structure of a ROADM node according to an embodiment of this application.

FIG. 4 is a schematic diagram of a structure of a complete ROADM node including C+L-band receive and transmit directions. As shown in FIG. 4, the ROADM node includes three dimensions (a first direction, a second direction, and a third direction) and a client side. Each of the first direction, the second direction, and the third direction includes two WSSs, namely, a WSS 100 and a WSS 200. The WSS 100 is configured to receive an optical signal from another ROADM node and perform cross-connection grooming on the received optical signal at this node. The WSS 200 is configured to send, to another ROADM node, the optical signal on which cross-connection grooming is performed at this node. For example, the two WSSs are of a 2×N structure and an N×2 structure (N=6 in this embodiment), respectively. The WSS 100 that receives an optical signal from another ROADM node and that is in the first direction is used as an example. The WSS 100 includes two common ports 101 and 102 and N branch ports. The branch port 101 is configured to receive a C-band optical signal, and the branch port 102 is configured to receive an L-band optical signal. Signal processing is performed on the C-band optical signal and the L-band optical signal in the 2×N WSS, including but not limited to wavelength demultiplexing, cross-connecting, and combining. Then, a plurality of branch signals are formed. One part of the plurality of branch signals are transported to the WSSs 200 in the other directions through some of the branch ports of the WSS 100, respectively. The other part of the plurality of branch signals are locally dropped. In this embodiment, there are two manners for dropping the branch signals. For the two manners, refer to the manners described in FIG. 2 and FIG. 3. Details are not described herein.

For local adding, two manners may be provided in this embodiment. In a manner 1, FIG. 4 shows a local up module 310 that corresponds to a C-band local down module 300. A C-band transmitter is connected to the local up module 310. 310 is then connected to branch ports 201 of the 2×N WSSs 200 that are configured to perform multiplexing and that are in the three directions. Likewise, an L-band transmitter is connected to a local up module 410 that corresponds to an L-band local down module 400. 410 is then connected to branch ports 202 of the 2×N WSSs 200 that are configured to perform multiplexing and that are in the three directions. In a manner 2, a C-band local up module 310 and an L-band local up module 410 are first connected to a C+L-band waveband filter array 510 for waveband combining, and then connected to branch ports 203 of the WSSs 200 (only the first direction is shown in the figure). A plurality of branch ports of the WSS 200 all support a C+L combined signal. A port 204 of two common ports combines only C-band optical signals input from the plurality of branch ports, and the other common port 205 combines only L-band optical signals input from the plurality of branch ports. The port 204 is then connected to a C-band optical amplifier 600. 205 is connected to an L-band optical amplifier 610. Output ports of the two optical amplifiers are connected to a C+L-band waveband filter 720.

It should be noted that in specific implementation, a C+L-band waveband filter 710 and the C+L-band waveband filter 720 may be implemented in one device, namely, a C+L waveband filter 700. A C+L waveband filter array 500 and the C+L waveband filter array 510 may also be implemented in one device. Likewise, a local down module and a local up module may also be implemented in one device, that is, implemented as a local up-down module. For example, the C-band local down module 300 and the local up module 310 may be made into a local up-down module 320. The WSS 100 used for wavelength demultiplexing and the WSS 200 used for wavelength multiplexing may also be implemented in one device. For example, the WSS 100 and the WSS 200 that are in the first direction may be replaced with a WSS 150.

It should be further noted that the local up module and the local down module in this embodiment may be directionless (that is, an uplink and a downlink are not distinguished from each other in the modules, and the modules may be used for both adding and dropping), may be colorless and directionless (CD) (that is, an uplink and a downlink are not distinguished from each other, wavelengths are not distinguished from each other, and bands are not distinguished from each other by the modules, and the modules may be used for both adding and dropping of any wavelength), may be colorless, directionless, and contentionless (CDC), or may be of another type. This is not limited herein. In specific implementation, the modules may be implemented based on a demultiplexer/multiplexer, an arrayed waveguide grating (AWG), a splitter/combiner, a multi-cast switch (MCS), an N×M WSS, and the like. This is not limited herein.

Figure 5:
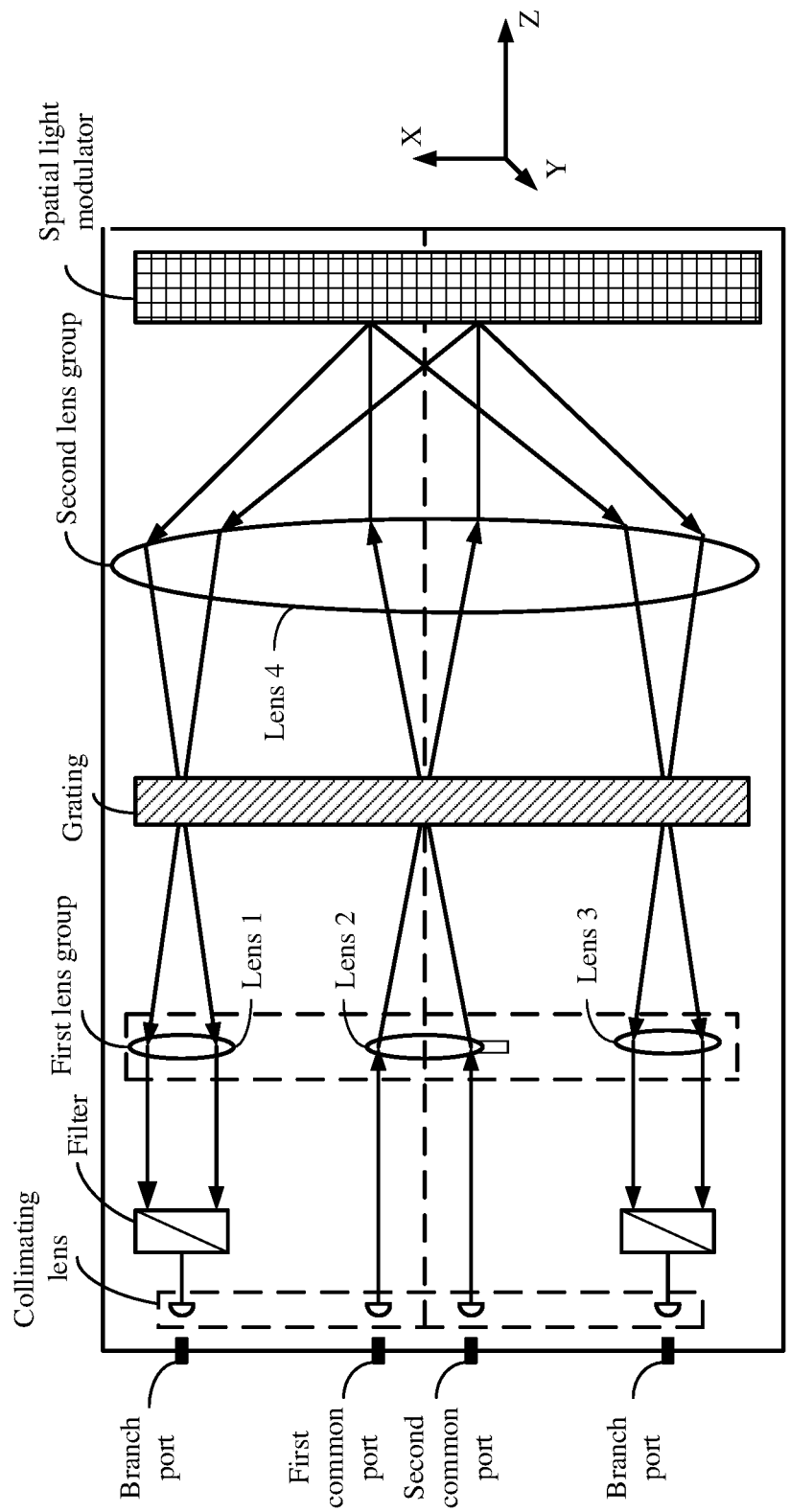
FIG. 5 is a schematic diagram of an optical structure of a 2×N WSS according to an embodiment of this application.

FIG. 5 is a schematic diagram of an optical structure of a 2×N WSS according to an embodiment of this application. As shown in FIG. 5, the WSS includes two common ports and N branch ports. The two common ports are respectively a C-band common port and an L-band common port, configured to receive a C-band optical signal and an L-band optical signal, respectively. On one side of the two common ports are optical fiber connectors, configured for connection of optical fibers. On the other side of the two common ports are collimating lenses, configured to beam-collimate optical signals entering an interior of the WSS. The N branch ports are located on two sides (in a direction X in the figure) of the two common ports, and configured to output branch signals that undergo optical spatial processing inside the WSS. Likewise, on one side of the N branch ports are optical fiber connectors, configured for connection of optical fibers. On the other side of the N branch ports are collimating lenses, configured to beam-collimate optical signals to be output. It should be noted that because an optical path is reversible, the N branch ports may be alternatively used to receive branch signals from WSSs in other dimensions, and the branch signals are output by the two common ports. A solid line in the figure indicates a light beam. The following uses a direction of the light beam (namely, a direction Z in the figure) as an example for description. For each of the N branch ports, the collimating lens is followed by a C+L-band filter apparatus, configured to split an optical signal into a C-band optical signal and an L-band optical signal or combine a C-band optical signal and an L-band optical signal into an optical signal. Then, the light beam passes through a first lens group. The first lens group may include a lens 1, a lens 2, and a lens 3. The first lens group is perpendicular to the direction Z. A grating is placed at a position of a focal point that is of the first lens group and that is not on a same side as the collimating lens. The grating disperses the light beam in a direction Y. The light beam dispersed by the grating passes through a second lens group, namely, a lens 4, that has a different specification from that of the lens 1. The lens 4 may be configured to change a direction of travel of the light beam, to make the light beam enter a switching engine. The grating and the switching engine are located on focal points of the lens 2 on two sides, respectively. The switching engine reflects the incident light beam at different deflection angles, so that the light beam dispersed by the grating emerges at different deflection angles. The light beam is deflected on a plane XZ.

In an implementation, the filter apparatus may include a waveband filter plate and a reflective lens. The grating may be a transmissive grating, a reflective grating, or a component with another optical function, for example, a prism grating. In FIG. 5, a transmissive grating is used as an example for description. The first lens group and the second lens group may be transmissive lenses or reflective lenses. In FIG. 5, a transmissive lens is used as an example for description. The switching engine may be a liquid crystal on silicon LCOS or a micro-electro-mechanical system (MEMS).

It should be noted that in specific implementation, in addition to the optical devices shown in FIG. 5, the WSS shown in this embodiment further includes a processing unit. The processing unit is configured to change output ports of signals of some wavelengths by controlling parameters of the optical devices, to implement dynamic wavelength selection. For specific implementation, refer to FIG. 12 below. Details are not described herein.

Figure 6:
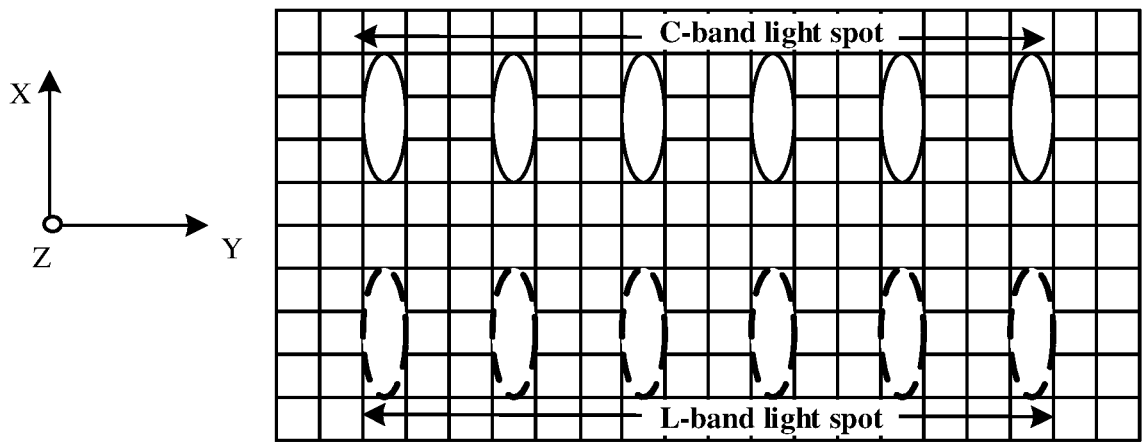
FIG. 6 is a schematic diagram of light spot spreading after an optical signal in FIG. 5 is dispersed by a diffraction grating.

The following uses an example for specific description in which an optical signal is incident from a common port and emerges from a branch port. A C-band optical signal and an L-band optical signal from optical fibers are incident from the C-band common port and the L-band common port, respectively, are beam-collimated by the collimating lenses, then pass through the lens 2, the grating, and the lens 4 sequentially, and reach the switching engine. The grating disperses incident light in the direction Y. Therefore, at the switching engine, a light spot of the C-band optical signal spreads in the direction Y, and likewise, a light spot of the L-band optical signal also spreads in the direction Y of the switching engine, as shown in FIG. 6. Because the C-band optical signal and the L-band optical signal are incident at different positions in the direction X (that is, the C-band common port and the L-band common port are at different positions in the direction X), in combination with optical path design in this embodiment, spread light spots of the C-band optical signal in the direction Y and spread light spots of the L-band optical signal in the direction Y are presented in two rows on the switching engine, with reference to FIG. 6. Based on a requirement of wavelength switching from the common ports to the branch ports, the switching engine deflects, at different angles in the direction X by using a lattice (or pixels) on the switching engine, light beams that are incident on the switching engine. The deflection angles are determined by ports from which optical signals need to emerge. Therefore, light spots corresponding to different wavelengths can be deflected at different angles, so that the wavelengths emerge from different branch ports. The light beams deflected at specific angles pass through the lens 4 and reach the grating. Wavelength multiplexing is performed at the grating. With each branch port as a unit, spread light beams of the C-band optical signal in the direction Y are multiplexed into one light beam, and spread light beams of the L-band optical signal in the direction Y are multiplexed into one light beam. The two multiplexed light beams pass through the lens 1 (or the lens 3). At the C/L filter, the C-band light beam and the L-band light beam are combined to generate a C+L combined signal. Then, the C+L combined signal enters a corresponding branch port after passing through the collimating lens.

For example, the 2×N WSS provided in this embodiment of this application includes a first grating and a second grating. The first grating is configured to perform multiplexing and demultiplexing on the C-band optical signal. The second grating is configured to perform multiplexing and demultiplexing on the L-band optical signal.

Because an optical path is reversible, an implementation of a case in which an optical signal is incident from a branch port and emerges from a common port is similar to an implementation of the case in which an optical signal is incident from a common port and emerges from a branch port. Therefore, details are not described herein again.

It should be noted that the light spot shown in FIG. 6 may be in a plurality of shapes, for example, a round shape or an oval shape. The oval shape is used as an example in this embodiment. Details are not described herein.

Figure 7:
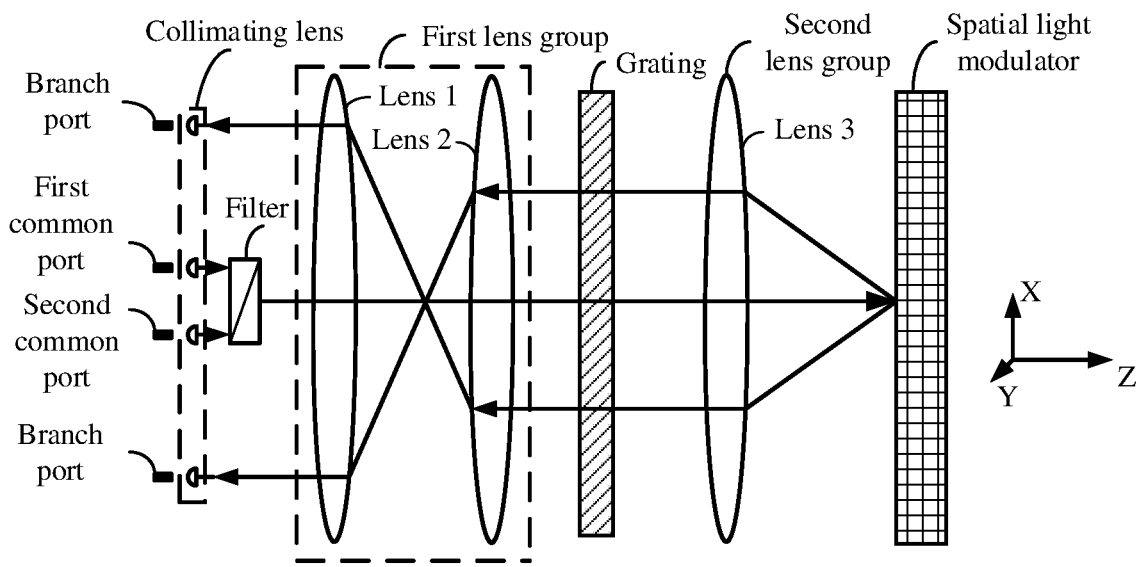
FIG. 7 is a schematic diagram of another optical structure of a 2×N WSS according to an embodiment of this application.

FIG. 7 is a schematic diagram of another internal structure of a 2×N WSS according to an embodiment of this application. As shown in FIG. 7, the WSS includes two common ports and N branch ports. The two common ports are respectively a C-band common port and an L-band common port, configured to receive a C-band optical signal and an L-band optical signal, respectively. On one side of the two common ports are optical fiber connectors, configured for connection of optical fibers. On the other side of the two common ports are collimating lenses, configured to beam-collimate optical signals entering an interior of the WSS. The N branch ports are located on two sides (in a direction X in the figure) of the two common ports, and configured to output branch signals that undergo optical spatial processing inside the WSS. Likewise, on one side of the N branch ports are optical fiber connectors, configured for connection of optical fibers. On the other side of the N branch ports are collimating lenses, configured to beam-collimate optical signals to be output. It should be noted that because an optical path is reversible, the N branch ports may be alternatively used to receive branch signals from WSSs in other dimensions, and the branch signals are output by the two common ports. A solid line in the figure indicates a light beam. The following uses a direction of the light beam (namely, a direction Z in the figure) as an example for description.

The two common ports are followed by a C+L-band filter apparatus, configured to split a light beam into a C-band light beam and an L-band light beam or combine a C-band light beam and an L-band light beam into a light beam. It should be noted that there is no such filter apparatus on a side of the N branch ports, which is also one of differences between the structures of the WSS in this embodiment and the WSS shown in FIG. 5 described above. For all the ports, a lens 1 is disposed behind them. The lens 1 is perpendicular to the direction Z. A lens 2 is disposed behind the lens 1. A distance between the lens 1 and the lens 2 in the direction Z is equal to a sum of focal lengths of the two lenses. The lens 1 and the lens 2 jointly form a first lens group. The lens 2 is followed by a grating. The grating disperses a C+L-band multiplexed light beam in a direction Y. Then, a lens 3 of a different specification follows, and may be configured to change an optical path. Then, a switching engine follows. The grating and the switching engine are on two sides of the lens 3, respectively. The switching engine is disposed on a focal point of the lens 3 in the direction Z. The switching engine reflects the incident light beam at different deflection angles, so that the light beam dispersed by the grating emerges at different deflection angles. The light beam is deflected on a plane XZ. It should be noted that the lens 3 may be a separate lens, or may include a plurality of sub-lenses with a same focal length. In either case, the lens 3 is referred to as a second lens group in this embodiment.

In an implementation, the filter apparatus may include a waveband filter plate and a reflective lens. The grating may be a transmissive grating, a reflective grating, or a component with another optical function, for example, a prism grating. In FIG. 7, a transmissive grating is used as an example for description. The switching engine may be a LCOS, a MEMS, or another device that can be used to implement optical switching. This is not limited in this application.

Figure 8:
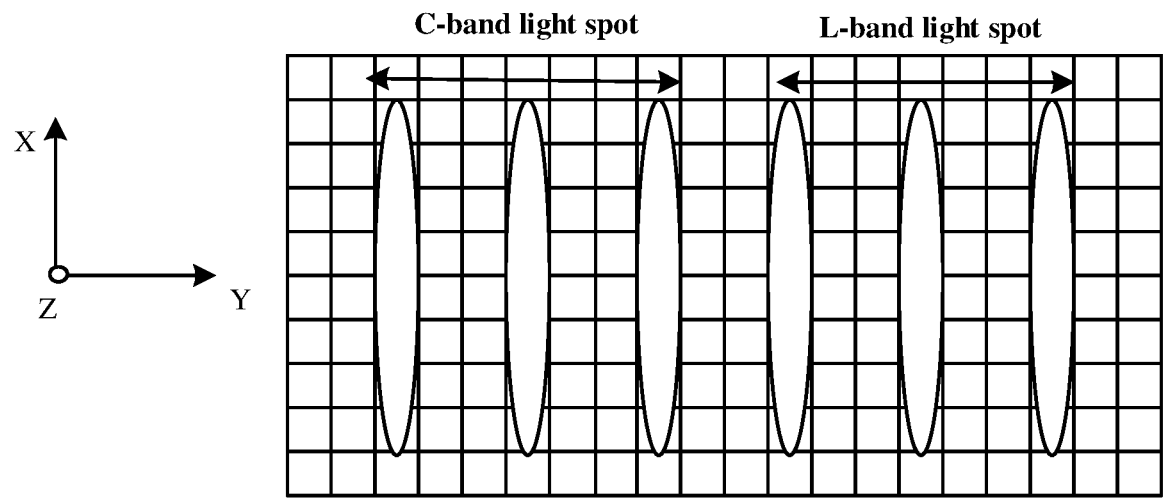
FIG. 8 is a schematic diagram of light spot spreading after an optical signal in FIG. 7 is dispersed by a diffraction grating.

The following uses an example for specific description in which an optical signal is incident from a common port and emerges from a branch port. A C-band optical signal from an optical fiber is incident from the C-band common port, and an L-band optical signal from an optical fiber is incident from the L-band common port. The optical signals of two bands are beam-collimated by the collimating lenses, and then combined by the C+L-band filter. A combined signal passes through the lens 1 and the lens 2 sequentially, and then reaches the grating. The grating disperses incident light in the direction Y. The dispersed optical signal passes through the lens 3 and reaches the switching engine. Because the grating disperses the optical signal in the direction Y, a light spot of the entire C+L-band optical signal spreads in the direction Y at the switching engine, as shown in FIG. 8. Different from the light spots shown in FIG. 6, light spots of the C+L-band optical signal in this embodiment are no longer arranged in different areas in the direction X, but are sequentially arranged on a plane of the switching engine in the direction Y. Based on a requirement of wavelength switching from the common ports to the branch ports, the switching engine deflects, at different angles in the direction X by using a lattice (or pixels) on the switching engine, a light beam that is incident on the switching engine. The deflection angles are determined by ports from which optical signals need to emerge. Light spots corresponding to different wavelengths are determined, based on ports from which the wavelengths emerge, to be deflected at different angles, so that the wavelengths emerge from different branch ports. The deflected light beams reach the grating through the lens 3, and are multiplexed at the grating, to form a C+L multiplexed signal. The multiplexed signal then passes through the lens 2 and the lens 1, is collimated by the collimating lens, and then enters a corresponding branch port.

Because an optical path is reversible, an implementation of a case in which an optical signal is incident from a branch port and emerges from a common port is similar to an implementation of the case in which an optical signal is incident from a common port and emerges from a branch port. Therefore, details are not described herein again.

Figure 9A:
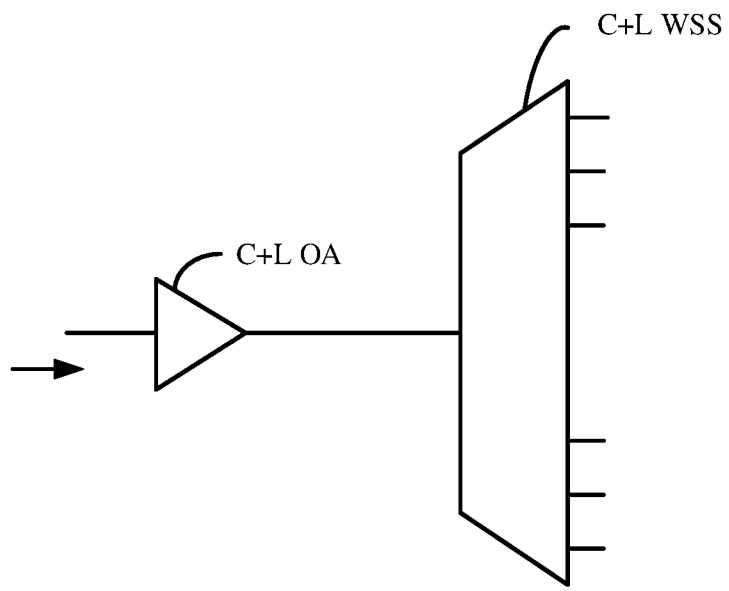
FIG. 9A is a diagram of an optical structure used in front of a 1×N WSS according to an embodiment of this application.
Figure 9B:
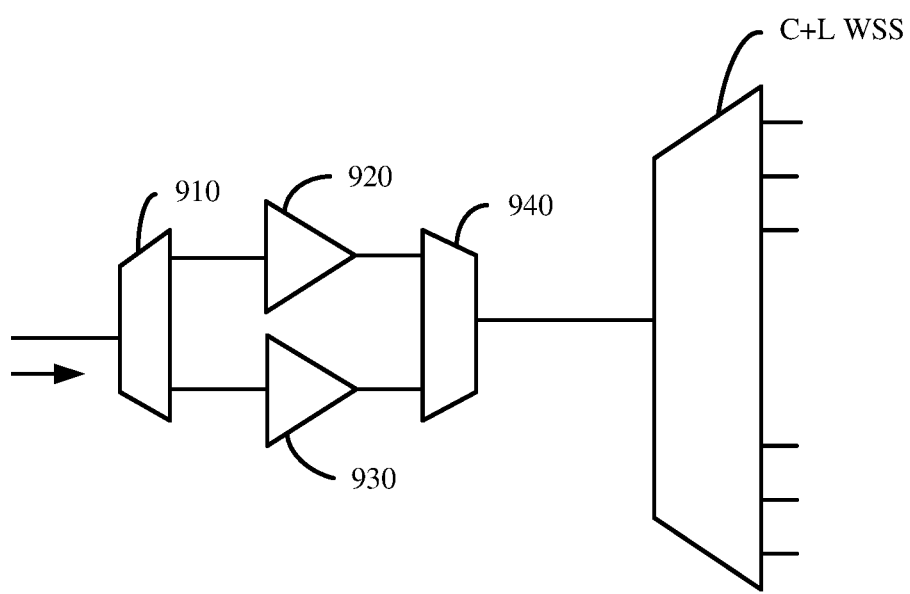
FIG. 9B is a diagram of another optical structure used in front of a 1×N WSS according to an embodiment of this application.

For example, the WSS in FIG. 7 described above may not have to be a 2×N WSS, and may be implemented by using a 1×N WSS whose common port supports the C-band and the L-band. As shown in FIG. 9A, in front of the 1×N WSS, an optical amplifier supporting the C-band and the L-band may be used to amplify a C-band optical signal and an L-band optical signal. Alternatively, as shown in FIG. 9B, in front of the 1×N WSS, a waveband filter 910, a C-band optical signal amplifier 920 and an L-band optical signal amplifier 930, and a waveband filter 940 are sequentially connected. The waveband filter 910 splits a received waveband combined signal into a C-band optical signal and an L-band optical signal. Then, the two optical amplifiers 920 and 930 may amplify the C-band optical signal and the L-band optical signal, respectively. Then, the waveband filter 940 combines the C-band optical signal and the L-band optical signal. It should be understood that when the 1×N WSS with all ports supporting the C-band and the L-band is used, the WSS can meet a requirement by providing only one input port. In this case, a C/L-band filter no longer needs to be disposed between the input port and a grating to split an optical signal into a C-band optical signal and an L-band optical signal and combine a C-band optical signal and an L-band optical signal into an optical signal.

Figure 10:
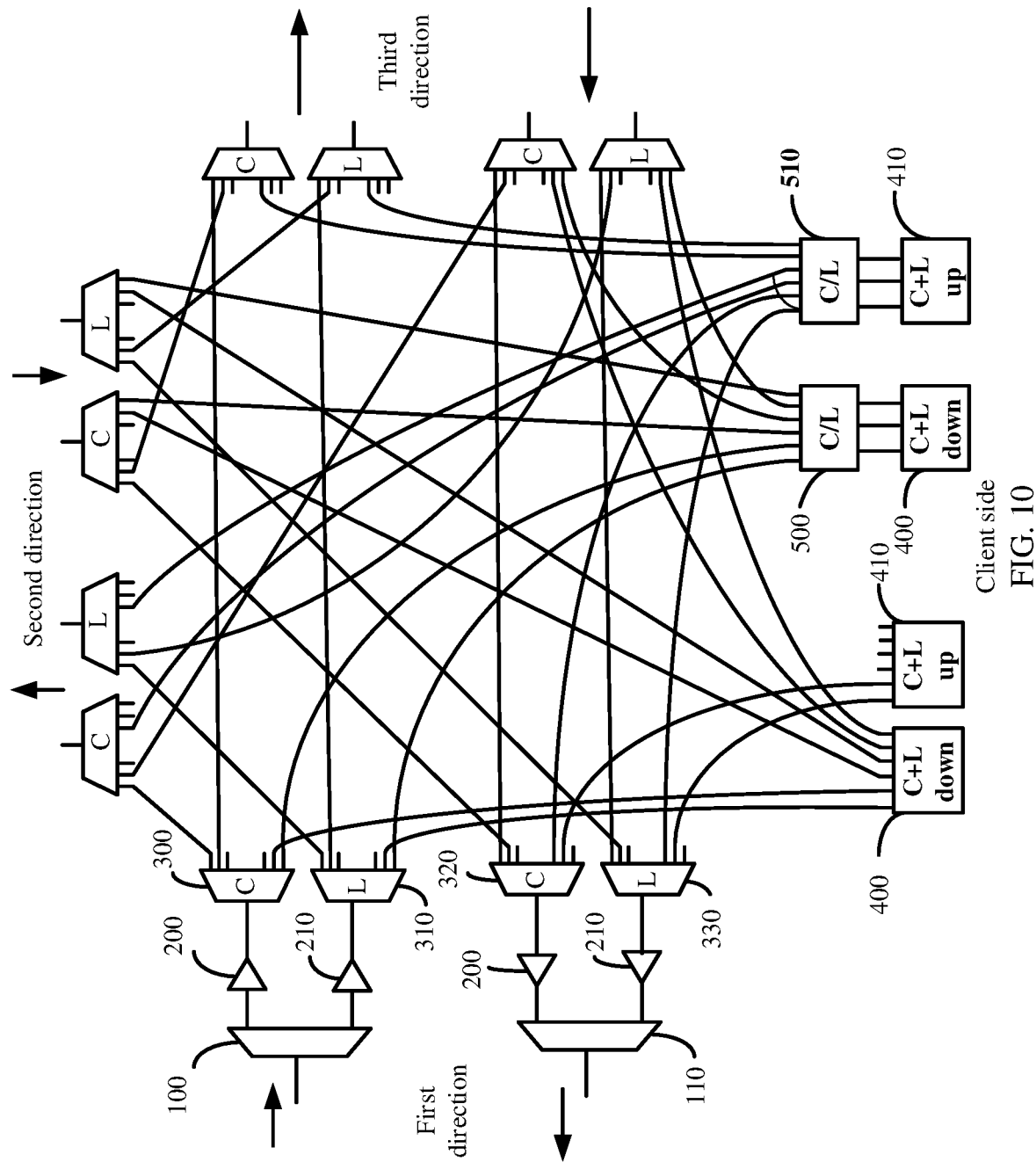
FIG. 10 is a schematic diagram of still another possible structure of a ROADM node according to an embodiment of this application.

FIG. 10 is a schematic diagram of another structure of a ROADM node according to an embodiment of this application. As shown in FIG. 10, the ROADM node includes three dimensions (directions). In each dimension, a receive side and a transmit side are distinguished from each other. On each of the receive side and the transmit side in each dimension, two 1×N WSSs and corresponding optical amplifiers are deployed. A receive side in a first direction is used as an example. A WDM optical signal enters this node from an optical fiber. The WDM optical signal first passes through a C+L-band waveband filter 100, and is split into a C-band optical signal and an L-band optical signal. Then, the C-band optical signal and the L-band optical signal pass through a C-band optical amplifier 200 and an L-band optical amplifier 210, respectively. The two amplifiers are connected to a C-band 1×N WSS 300 and an L-band 1×N WSS 310, respectively. One part of branch ports of the two WSSs are connected to some of branch ports of the WSSs in other dimensions, respectively, to transmit optical signals that do not need to be locally dropped to destination directions of the optical signals, thereby implementing optical switching in the ROADM node. The other part of the branch ports of the two WSSs are connected to a local down module to implement dropping. A transmit side in the first direction is used as an example. Some of branch ports of a C-band WSS 320 and an L-band WSS 330 are connected to some of branch ports of corresponding-band WSSs in the other dimensions, respectively, to receive optical signals from the other dimensions and transmit the optical signals to the first direction, thereby implementing optical switching in the ROADM node. The switched optical signals are respectively multiplexed into a C-band optical signal and an L-band optical signal, which are then output from corresponding WSS common ports, respectively. The optical signal output by the C-band WSS enters a C-band optical amplifier 200 for optical power amplification. The optical signal output by the L-band WSS enters an L-band optical amplifier 210 for optical power amplification. The two groups of amplified optical signals then enter a C+L-band waveband filter 110 to form a WDM optical signal, which is then output through an optical fiber.

For an uplink and a downlink of a wavelength, a local down module and a local up module that can support both a C-band and an L-band are used in this embodiment. For example, a local down module 400 supporting both the C-band and the L-band is used. There are two manners for connecting branch ports of the WSSs on the receive sides in the three dimensions to the local down module 400 on a client side. In a manner 1, branch ports of the C-band WSS 300 and the L-band WSS 310 are directly connected to line-side ports of the local down module 400, respectively. In a manner 2, branch ports of the C-band WSS 300 and branch ports of the L-band WSS 310 in the same direction are first connected to branch ports of a waveband filter array 500, and then common ports of the waveband filter array 500 are connected to line-side ports of the local down module 400.

For example, a local up module 410 supporting both the C-band and the L-band is used. There are also two manners for connecting branch ports of the WSSs on the transmit sides in the three dimensions to the local up module 410 on the client side. In a manner 1, a line-side port of the local up module 410 is directly connected to a branch port of the C-band WSS 320 or the L-band WSS 330. In a manner 2, a line-side port of the local up module 410 is first connected to a common port of a waveband filter array 510, and then branch ports of the waveband filter array 510 are connected to branch ports of the C-band WSS 320 and branch ports of the L-band WSS 330, respectively. It should be understood that only the receive side and the transmit side in the first direction are used as examples for description in this embodiment. A manner of processing a C-band optical signal and an L-band optical signal in a second direction and a third direction is no different from a processing manner in the first direction. Details are not described herein again.

t should be further noted that a local up-down module supporting both the C-band and the L-band may be alternatively used in this embodiment. Based on optical path reversibility, the local up-down module can implement functions of both the foregoing local down module and the foregoing local up module, with up and down directions of a wavelength no longer being distinguished from each other. An implementation principle of the local up-down module is the same as that in the foregoing embodiment. Details are not described herein again.

Based on the embodiment described in FIG. 10, a service-side port of the local down module, the local up module, or the local up-down module can add and drop an optical signal carried by any wavelength in the C-band and the L-band, that is, being colorless in an entire C+L wavelength range.

In FIG. 10, which is used as a possible implementation in a current waveband upgrade process, there is no need to remove an existing optical processing device supporting only the C-band. Devices processing the L-band, such as an optical amplifier, an L-band 1×N WSS, and an L-band up-down module, may be added on a basis of an existing configuration, to implement a waveband upgrade. In this way, a waveband upgrade is simplified, and costs can be reduced. In addition, the following advanced upgrade requirement may also be met: upgrading an optical system in which only the C-band is used in an initial phase, and an operating band extends to the L-band later.

Figure 11:
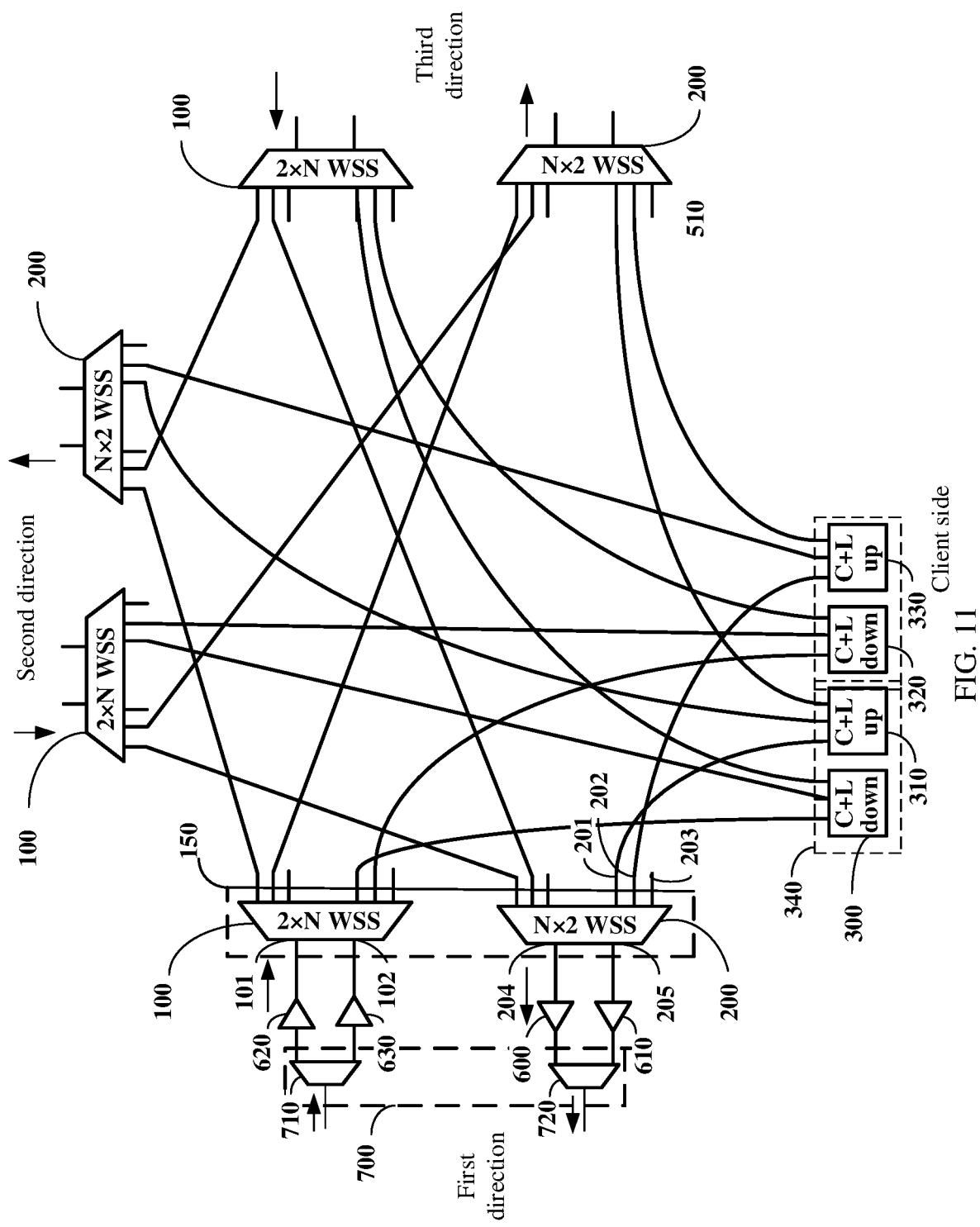
FIG. 11 is a schematic diagram of yet another possible structure of a ROADM node according to an embodiment of this application.

FIG. 11 is a schematic diagram of still another structure of a ROADM node according to an embodiment of this application. As shown in FIG. 11, the ROADM node includes three dimensions (a first direction, a second direction, and a third direction) and a client side. Each of the first direction, the second direction, and the third direction includes two WSSs, namely, a WSS 100 and a WSS 200. The WSS 100 is configured to receive an optical signal from another ROADM node and perform cross-connection grooming on the received optical signal at this node. The WSS 200 is configured to send, to another ROADM node, the optical signal on which cross-connection grooming is performed at this node. For example, the two WSSs are of a 2×N structure and an N×2 structure (N=6 in this embodiment), respectively, and each of the two WSSs includes two common ports and N branch ports. It should be understood that whether the common ports and the branch ports are specifically configured to perform reception or transmission depends on whether the WSS is disposed on a transmit side or a receive side of the node. A receive side in the first direction is used as an example. A WDM optical signal enters this node from an optical fiber. The WDM optical signal first passes through a C+L-band waveband filter 710, and is split into a C-band optical signal and an L-band optical signal. Then, the C-band optical signal and the L-band optical signal pass through a C-band optical amplifier 620 and an L-band optical amplifier 630, respectively. The two groups of amplifiers are connected to a C-band common port 101 and an L-band common port 102 of the 2×N WSS 100, respectively. One part of the N branch ports of the 2×N WSS 100 are connected to some of branch ports of the N×2 WSSs 200 in the other dimensions, respectively, and the other part of the N branch ports of the 2×N WSS 100 are connected to a local down module 300. The ROADM node structure provided in this embodiment is partially the same as the node structure shown in FIG. 4. A difference lies in local adding and dropping of an optical signal.

For local dropping, the local down module 300 supporting both a C-band and an L-band is provided in this embodiment. Some of the branch ports of the 2×N WSS 100 are directly connected to line-side ports of the C+L local down module 300. A service-side port of the C+L local down module 300 is connected to an optical receiver. A C+L optical signal output from a branch port of the 2×N WSS 100 may be directly processed by the C+L local down module 300. For local adding, a service-side port of a C+L local up module 310 is connected to an optical receiver, and line-side ports of the C+L local up module 310 are directly connected to some of branch ports of the N×2 WSS 200. The service-side ports of the local down module 300 and the local up module 310 no longer distinguish between bands. Each port can add/drop signal of any wavelength. In this way, a same service needs only half a quantity of ports to implement adding and dropping, thereby reducing a quantity of ports of a device and a volume of the device.

It should be noted that an application scenario described in this embodiment is as follows: When a network is built, this node can support adding, dropping, and optical switching of both a C-band optical signal and an L-band optical signal. However, when service traffic in the network is not heavy in an early stage, only the C-band optical signal may need to be processed. In this case, configuring one local down module 300 and one local up module 310 on the client side can meet a service requirement. As the service traffic increases, a service bearer band extends to the L-band. In this case, only a small quantity of optical devices, for example, optical amplifiers, that process the L-band need to be added to implement a waveband upgrade for the node. In this case, due to an increase in the service traffic, it may be difficult for the existing local up module and local down module to meet a service requirement. Therefore, a local down module 320 and a local up module 330 need to be added accordingly. The local down module 320 may be the same as the local down module 300, and the local up module 330 may be the same as the local up module 310. This is not limited in this embodiment.

For example, a local up-down module integrating a function of a wavelength down module and a function of a wavelength up module may be alternatively used in this embodiment. The local up-down module may be implemented based on a principle that an optical path is reversible. For example, the local up-down module may be implemented based on a demultiplexer/multiplexer, an AWG, a splitter/combiner, a multi-cast switch MCS, an N×M WSS, or the like. This is not limited herein.

Based on the embodiment shown in FIG. 11, the C+L-band local down module 300 can drop an optical signal carried by any wavelength in the C-band and the L-band, and the C+L-band local up module 310 can add an optical signal carried by any wavelength in the C-band and the L-band, that is, being colorless in an entire C+L wavelength range. In this way, signals of different wavelengths in different bands can be added and dropped by using a specific quantity of ports, thereby reducing a quantity of ports and miniaturizing a device.

Figure 12:
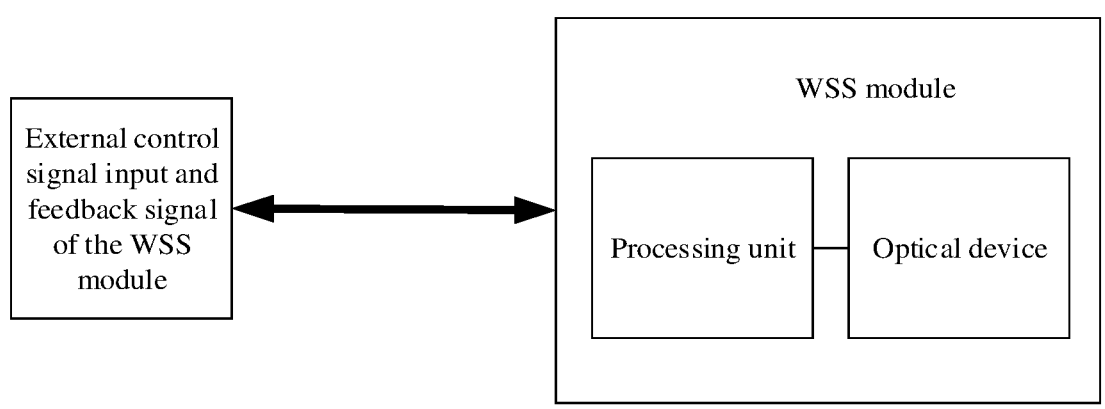
FIG. 12 is a schematic diagram of a structure of a WSS module according to an embodiment of this application.

The ROADM shown in this application has a capability of dynamic wavelength selection, which may be implemented by remotely configuring the WSS modules of the ROADM node by using software. Specifically, as shown in FIG. 12, the WSS module shown in this embodiment may be simply divided into two parts, namely, a processing unit and an optical device unit, and provides an interactive interface to the outside, to implement input of an external control signal into the WSS module and output of a feedback signal of the WSS module. For the optical device unit, refer to the embodiments shown in FIG. 5 and FIG. 7. The processing unit is configured to process an input signal, and change output ports of signals of some wavelengths by controlling parameters of some optical devices (for example, controlling a voltage of a spatial light modulator). The processing unit may include components such as a field programmable gate array (FPGA), a random access memory (RAM), a read only memory (ROM), an LCOS spatial light modulator control circuit (or controller), and an analog-to-digital converter (ADC).

Figure 13:
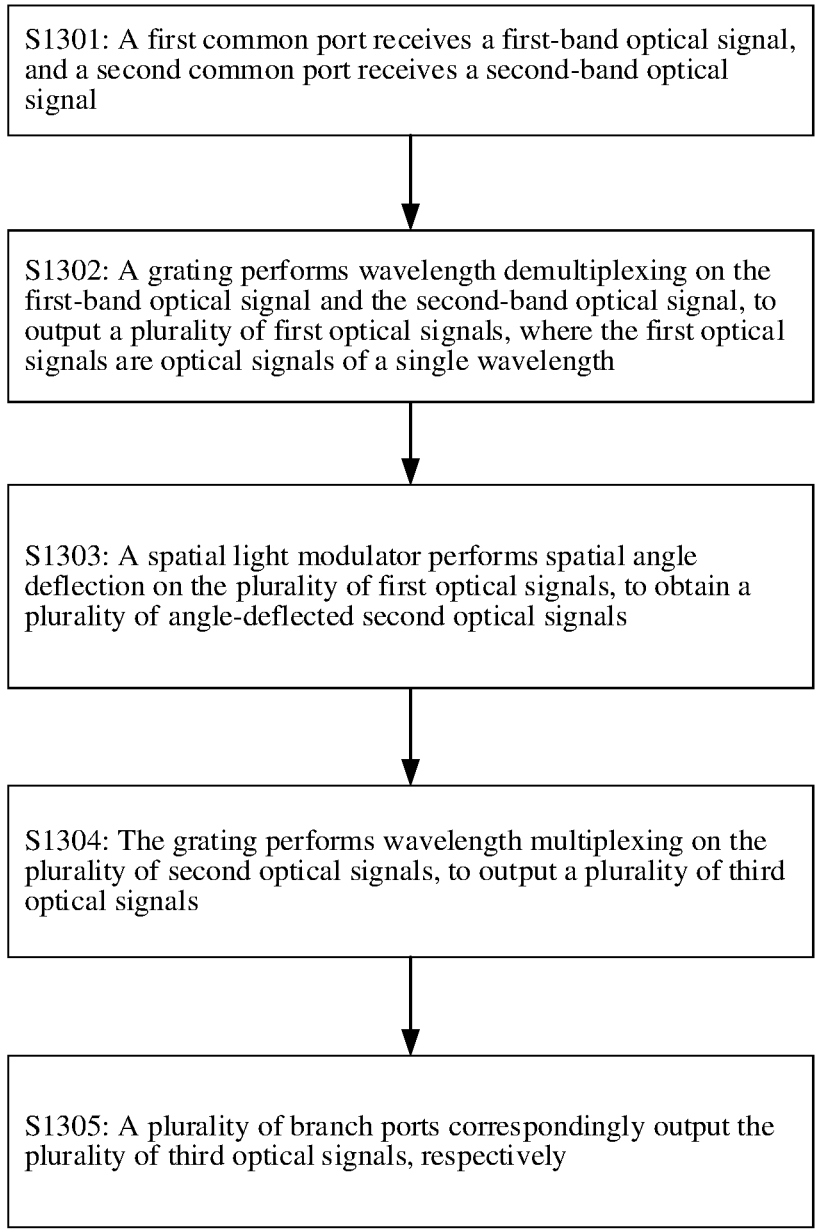
FIG. 13 is a flowchart of a wavelength processing method according to an embodiment of this application.

FIG. 13 is a flowchart of a wavelength processing method according to an embodiment of this application. The method includes the following steps.

S1301: A first common port receives a first-band optical signal, and a second common port receives a second-band optical signal.

In this embodiment, a used WSS may be a 2×N WSS, and has two common ports and N branch ports. One of the two common ports is configured to receive the first-band optical signal, and the other of the two common ports is configured to receive the second-band optical signal.

For example, the first-band optical signal is a C-band optical signal, and the second-band optical signal is an L-band optical signal.

For example, the WSS in this embodiment further includes a filter. The filter is configured to combine the received first-band optical signal and the received second-band optical signal into a multi-band optical signal.

For another example, the WSS in this embodiment is a 1×N WSS, and has one common port and N branch ports. The common port of the 1×N WSS is configured to receive a combined signal of a first-band optical signal and a second-band optical signal. In this case, each port of the 1×N WSS supports both the first-band optical signal and the second-band optical signal.

S1302: A grating performs wavelength demultiplexing on the first-band optical signal and the second-band optical signal, to output a plurality of first optical signals, where the first optical signals are optical signals of a single wavelength.

For example, before entering the grating, the first-band optical signal and the second-band optical signal pass through a filter. The filter combines the first-band optical signal and the second-band optical signal into a beam of optical signals of a plurality of wavelengths.

For example, further, there is a first lens group between the ports and the diffraction grating, and the first lens group is configured to focus the combined signal obtained by using the filter.

The grating disperses the incoming combined signal of the first-band optical signal and the second-band optical signal, as shown in FIG. 7. The dispersed combined signal spreads in a direction Y. For spread light spots, refer to FIG. 8.

S1303: A spatial light modulator performs spatial angle deflection on the plurality of first optical signals, to obtain a plurality of angle-deflected second optical signals.

The spatial light modulator in this embodiment may be an LCOS or a MEMS, and is configured to implement spatial angle deflection on the plurality of first optical signals. For example, by controlling a loading voltage of each pixel on the LCOS, the outside can make optical signals that are incident on the pixels have different deflection angles. Different deflection angles correspond to different branch ports, so that the plurality of optical signals are output to corresponding branch ports.

For example, a second lens group is further included between the grating and the spatial light modulator, and configured to focus the plurality of first optical signals. The spatial light modulator is located on a focal point that is on a different side from that of the grating and that is of the second lens group.

S1304: The grating performs wavelength multiplexing on the plurality of second optical signals, to output a plurality of third optical signals.

The plurality of second optical signals are still optical signals of a single wavelength. After the grating performs wavelength multiplexing on the plurality of second optical signals, branch port-based optical signals of a plurality of wavelengths, namely, the third optical signals, are obtained. The plurality of third optical signals correspond to the plurality of branch ports, respectively.

The plurality of third optical signals in this embodiment may include both the first-band optical signal and the second-band optical signal, or may include only the first-band optical signal, or may include only the second-band optical signal; or it may be that some of the third optical signals include both the first-band optical signal and the second-band optical signal, some of the third optical signals include only the first-band optical signal, and some of the third optical signals include only the second-band optical signal. This is not limited in this embodiment.

S1305: The plurality of branch ports correspondingly output the plurality of third optical signals, respectively.

For example, before being output from the branch ports, the plurality of second optical signals may be further focused by the first lens group. Then, the plurality of third optical signals are correspondingly output by the plurality of branch ports.

Terms such as "first", "then", and "finally" in the specification, claims, and accompanying drawings of embodiments of this application are not used to describe a specific order or sequence. It should be understood that data used in such a way may be interchangeable in appropriate circumstances, so that embodiments described herein can be implemented in an order other than the content illustrated or described herein. In addition, terms "include" or "have" and any variant thereof are intended to cover non-exclusive solutions.

Although this application is described with reference to specific features and embodiments thereof, it is clear that various modifications and combinations may be made to this application without departing from the scope of this application. Correspondingly, this specification and the accompanying drawings are merely example descriptions of this application defined by the appended claims, and are considered as any or all of modifications, variations, combinations or equivalents that cover the scope of this application. Clearly, a person skilled in the art can make various modifications and variations to this application without departing from the spirit and scope of this application. This application is intended to cover these modifications and variations provided that they fall within the scope of protection defined by the following claims and their equivalent technologies.

What is claimed is:

1. An optical switching device, comprising:
a first wavelength selective switch (WSS), wherein the first WSS comprises at least one first common port and a plurality of first branch ports, each first branch port of the plurality of first branch ports is configured to output a first-band optical signal, a second-band optical signal, or a combined signal of the first-band optical signal and the second-band optical signal;
a first down module, connected to a first branch port of the plurality of first branch ports of the first WSS, and configured to drop the first-band optical signal or the first-band optical signal in the combined signal;
a second down module, connected to a second branch port of the plurality of first branch ports of the first WSS, and configured to drop the second-band optical signal or the second-band optical signal in the combined signal, and wherein the first branch port and the second branch port are the same branch port or different branch ports of the first WSS;

a second WSS, wherein the second WSS comprises at least one second common port and a plurality of second branch ports, and each second branch port of the plurality of second branch ports is configured to input a first-band optical signal, a second-band optical signal, or a combined signal of the first-band optical signal and the second-band optical signal, and at least one second branch port of the plurality of second branch ports is connected to at least one first branch port of the plurality of first branch ports;

a first up module, connected to a third branch port of the plurality of second branch ports of the second WSS, and configured to add the first-band optical signal; and a second up module, connected to a fourth branch port of the plurality of second branch ports of the second WSS, and configured to add the second-band optical signal, and wherein the third branch port and the fourth branch port are the same branch port or different branch ports of the second WSS.

2. The optical switching device according to claim 1, further comprising:
a first band filter, located between the first WSS and the first down module.

3. The optical switching device according to claim 2, wherein the first band filter is further located between the first WSS and the second down module.

4. The optical switching device according to claim 2, wherein the first band filter is configured to split the combined signal output by the first branch port and the second branch port of the first WSS to the first-band optical signal and the second-band optical signal.

5. The optical switching device according to claim 1, wherein the first branch port is configured to output the first-band optical signal, and the second branch port is configured to output the second-band optical signal.

6. The optical switching device according to claim 5, wherein the first branch port and the second branch port are different branch ports.

7. The optical switching device according to claim 1, wherein the first WSS comprises at least two first common ports, a first common port of the at least two first common ports is configured to input the first-band optical signal, and a second common port of the at least two first common ports is configured to input the second-band optical signal.

8. The optical switching device according to claim 1, further comprising:
a second band filter, located between the second WSS and the first up module and further located between the second WSS and the second up module; and
wherein the second band filter is configured to combine the received first-band optical signal and the received second-band optical signal.

9. The optical switching device according to claim 1, further comprising:
a third WSS, wherein the third WSS comprises at least one third common port and a plurality of third branch ports, and at least one third branch port of the plurality of third branch ports of the third WSS is connected to at least one first branch port of the plurality of first branch ports of the first WSS.

10. The optical switching device according to claim 1, wherein:
the first down module is further configured to drop the second-band optical signal.

11. The optical switching device according to claim 1, wherein the first down module is further configured to add the first-band optical signal; or
the second down module is further configured to add the second-band optical signal.

12. The optical switching device according to claim 1, wherein the first WSS comprises a first common port, a second common port, a grating, a spatial light modulator, and the plurality of first branch ports;

wherein the first common port is configured to receive the first-band optical signal, and the second common port is configured to receive the second-band optical signal;

wherein the grating is configured to perform wavelength demultiplexing on the first-band optical signal and the second-band optical signal, to output a plurality of first optical signals, wherein the first optical signals are optical signals of a single wavelength;

wherein the spatial light modulator is configured to perform spatial angle deflection on the plurality of first optical signals, to obtain a plurality of angle-deflected second optical signals;

wherein the grating is further configured to perform wavelength multiplexing on the plurality of angle-deflected second optical signals, to obtain a plurality of third optical signals; and wherein the plurality of first branch ports are configured to output the plurality of third optical signals.

13. The optical switching device according to claim 1, wherein each first branch port of the plurality of first branch ports is configured to selectively output each of the first-band optical signal, the second-band optical signal, and the combined signal of the first-band optical signal and the second-band optical signal.

14. The optical switching device according to claim 1, wherein:
the first up module is further configured to add the second-band optical signal.

15. An optical switching device, comprising:
a first wavelength selective switch (WSS), wherein the first WSS comprises at least one first common port and a plurality of first branch ports, wherein the at least one first common port is an input port and the plurality of first branch ports are output ports, or the plurality of first branch ports are input ports and the at least one first common port is an output port;

a band filter, wherein the band filter comprises at least one second common port and a plurality of second branch ports, and the at least one second common port of the band filter is connected to a first branch port of the plurality of first branch ports of the first WSS;

a first combiner-divider, wherein the first combiner-divider is connected to at least one branch port of the plurality of second branch ports of the band filter, and is configured to add or drop a first-band optical signal or a second-band optical signal; and a second WSS, wherein the second WSS comprises at least one third common port and a plurality of third branch ports, and a third branch port of the plurality of third branch ports of the second WSS is connected to a second branch port of the plurality of first branch ports of the first WSS, wherein the at least one third common port is an input port and the plurality of third branch ports are output ports, or the plurality of third branch ports are input ports and the at least one third common port is an output port.

16. The optical switching device according to claim 15, wherein the first-band optical signal is a C-band optical signal, or the second-band optical signal is an L-band optical signal.

17. The optical switching device according to claim 15, wherein the band filter is configured to split a combined signal output by the first branch port of the first WSS to the first-band optical signal and the second-band optical signal.

18. The optical switching device according to claim 15, further comprising:
- a second combiner-divider, wherein the second combiner-divider is connected to a third branch port of the plurality of first branch ports of the first WSS, and is configured to add or drop the first-band optical signal and the second-band optical signal.

19. The optical switching device according to claim 15, further comprising:
- an optical amplifier, wherein the optical amplifier comprises an input port and an output port, and the output port of the optical amplifier is connected to the at least one first common port of the first WSS.

20. The optical switching device according to claim 19, wherein a second branch port of the plurality of second branch ports of the band filter is connected to the input port of the optical amplifier.

\* \* \* \* \*